(12) United States Patent
Carlson

(10) Patent No.: US 6,488,721 B1
(45) Date of Patent: Dec. 3, 2002

(54) METHODS OF PREPARING ELECTROCHEMICAL CELLS

(75) Inventor: Steven A. Carlson, Boston, MA (US)

(73) Assignee: Moltech Corporation, Tucson, AZ (US)

(*) Notice: Subject to any disclaimer, the term of this patent is extended or adjusted under 35 U.S.C. 154(b) by 0 days.

(21) Appl. No.: 09/590,458

(22) Filed: Jun. 9, 2000

(51) Int. Cl.$^7$ ................................................. H01M 6/00
(52) U.S. Cl. ...................... 29/623.5; 429/34; 429/137; 429/164; 429/231.9
(58) Field of Search ........................ 429/34, 137, 164, 429/231.9, 303, 623.5; 29/623.1, 623.3

(56) References Cited

U.S. PATENT DOCUMENTS

| 3,625,771 A | 12/1971 | Arrance et al. |
| 4,143,214 A | 3/1979 | Chang et al. |
| 4,152,491 A | 5/1979 | Chang et al. |

(List continued on next page.)

FOREIGN PATENT DOCUMENTS

| EP | 143562 A | 6/1985 |
| EP | 705710 A | 4/1996 |
| EP | 848435 A1 | 6/1998 |
| EP | 850778 A | 7/1998 |
| EP | 892449 A1 | 1/1999 |
| JP | 11-233144 A | 8/1999 |
| WO | WO 99/33125 A | 7/1999 |
| WO | WO 00/36670 A | 6/2000 |
| WO | WO 00/67339 A | 11/2000 |
| WO | WO 00/67340 A | 11/2000 |
| WO | WO 00/76011 A | 12/2000 |

OTHER PUBLICATIONS

World Patent Index, Derwent Publications, London, Abstract No. XP–002165388, corresponding to JP 48–028629 B, (1973).
Patent Abstracts of Japan, vol. 1999, No. 13, corresponding to JP 11–233144 A (Nov. 30, 1999).
Ichinose et al., "A Surface Sol–Gel Process of $TiO_2$ and Other Metal Oxide Films with Molecular Precision", *Chemistry of Materials*; 1997, 9(6), 1296–1298.

Primary Examiner—Carol Chaney
Assistant Examiner—Dah-Wei D. Yuan
(74) Attorney, Agent, or Firm—Jacqueline M. Nicol; Steven A. Carlson; Squire, Sanders & Dempsey L.L.P.

(57) ABSTRACT

Provided are methods of preparing a cathode/separator assembly for use in electrochemical cells in which a microporous separator layer is coated on a temporary carrier substrate and a cathode active layer is then coated or laminated on the separator layer prior to removing the temporary carrier substrate from the separator layer. The microporous separator layer may comprise one or more microporous xerogel layers. Optionally, the cathode/separator assembly may comprise one or more protective coating layers which are in contact with at least one of the microporous xerogel layers, and one of the protective coating layers may be coated on the temporary carrier substrate prior to coating the separator layer. Also, provided are methods of preparing electrochemical cells utilizing cathode/separator assemblies prepared by such methods, and cathode/separator assemblies and electrochemical cells prepared by such methods.

74 Claims, 12 Drawing Sheets

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | De Jonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,326,391 A | 7/1994 | Anderson et al. |
| 5,350,645 A * | 9/1994 | Lake et al. ............... 429/124 |
| 5,415,954 A | 5/1995 | Gauthier et al. |
| 5,418,091 A | 5/1995 | Gozdz et al. |
| 5,439,760 A | 8/1995 | Howard et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,549,717 A | 8/1996 | Takeuchi et al. |
| 5,601,947 A | 2/1997 | Skotheim et al. |
| 5,690,702 A | 11/1997 | Skotheim et al. |
| 5,723,230 A | 3/1998 | Naoi et al. |
| 5,778,515 A | 7/1998 | Menon |
| 5,882,721 A | 3/1999 | Delnick |
| 5,894,656 A | 4/1999 | Menon et al. |
| 5,919,587 A | 7/1999 | Mukherjee et al. |
| 5,948,464 A | 9/1999 | Delnick |
| 6,117,590 A | 9/2000 | Skotheim et al. |
| 6,153,337 A | 11/2000 | Carlson et al. |
| 6,194,098 B1 | 2/2001 | Ying et al. |
| 6,201,100 B1 | 3/2001 | Gorkovenko et al. |
| 6,306,545 B1 * | 10/2001 | Carlson et al. ............ 429/247 |

\* cited by examiner

METHODS OF PREPARING ELECTROCHEMICAL CELLS

RELATED APPLICATION

This application claims priority to U.S. Provisional Patent Application Ser. No. 60/139,031, filed Jun. 9, 1999, the contents of which are incorporated herein by reference in their entirety.

TECHNICAL FIELD

The present invention relates generally to the fields of electrochemical cells and of separators for use in electrochemical cells. More particularly, this invention pertains to methods of preparing a cathode/separator assembly in which a microporous separator layer is coated on a temporary carrier substrate and a cathode active layer is then coated on the separator layer prior to removing the temporary carrier substrate from the separator layer. Also, this invention pertains to methods of preparing electrochemical cells utilizing cathode/separator assemblies prepared by the methods of this invention. The present invention also pertains to cathode/separator assemblies and electrochemical cells prepared by such methods.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

In an electrochemical cell or battery, discharge of the cell from its charged state occurs by allowing electrons to flow from the anode to the cathode through an external circuit resulting in the electrochemical reduction of the cathode active material at the cathode and the electrochemical oxidation of the anode active material at the anode. Under undesirable conditions, electrons may flow internally from the anode to the cathode, as would occur in a short circuit. To prevent this undesirable internal flow of electrons that occurs in a short circuit, an electrolyte element is interposed between the cathode and the anode. This electrolyte element must be electronically non-conductive to prevent the short circuiting, but must permit the transport of ions between the anode and the cathode during cell discharge, and in the case of a rechargeable cell, also during recharge. The electrolyte element should also be stable electrochemically and chemically towards both the anode and the cathode.

Typically, the electrolyte element contains a porous material, referred to as a separator since it separates or insulates the anode and the cathode from each other, and an aqueous or non-aqueous electrolyte in some or all of the pores of the separator. The aqueous or non-aqueous electrolyte typically comprises ionic electrolyte salts and water or electrolyte solvents, and optionally, other materials or additives such as, for example, ionically conductive polymers. A variety of materials have been used for the porous layer or separator of the electrolyte element in electrochemical cells. These porous separator materials include polyolefins such as polyethylenes and polypropylenes, glass fiber and paper filter papers, and ceramic materials. Usually these separator materials are supplied as porous free standing films which are interleaved with the anodes and the cathodes in the fabrication of electrochemical cells. Alternatively, the porous layer can be applied directly to one of the electrodes, for example, as described in U.S. Pat. No. 3,625,771 to Arrance et al., 5,194,341 to Bagley et al., and U.S. Pat. No. 5,882,721 and U.S. Pat. No. 5,948,464 to Delnick; and in Eur. Pat. Application Nos. 848,435 to Yamashita et al.; and 892,449 to Bogner.

Porous separator materials have been fabricated by a variety of processes including, for example, stretching combined with special heating and cooling of plastic films, extraction of a soluble plasticizer or filler from plastic films, and plasma oxidation. The methods for making free standing separators typically involve extrusion of melted polymeric materials either followed by a post-heating and stretching or drawing process or followed by a solvent extraction process to provide the porosity throughout the separator layer. U.S. Pat. No. 5,326,391 to Anderson et al. and references therein, describe the fabrication of free standing porous materials based on extraction of a soluble plasticizer from pigmented plastic films. U.S. Pat. No. 5,418,091 to Gozdz et al. and references therein, describe forming electrolyte layers by extracting a soluble plasticizer from a fluorinated polymer matrix either as a coated component of a multilayer battery structure or as a free standing separator film. U.S. Pat. No. 5,894,656 to Menon et al. describes forming an electrode directly on the surface of an electrolyte layer having a soluble plasticizer and then extracting the plasticizer to activate the battery. U.S. Pat. No. 5,194,341 to Bagley et al. describes an electrolyte element with a microporous silica layer and an organic electrolyte. The microporous silica layer was the product of the plasma oxidation of a siloxane polymer.

U.S. patent application Ser. No. 08/995,089 titled "Separators for Electrochemical Cells," filed Dec. 19, 1997 now U.S. Pat. No. 6,153,337, to Carlson et al. of the common assignee, describes separators for use in electrochemical cells which comprise a microporous pseudo-boehmite layer, and electrolyte elements and cells comprising such separators. The pseudo-boehmite separators and methods of preparing such separators are described for both free standing separators and as a separator layer coated directly onto an electrode.

When a separator layer is coated directly onto an electrode, such as onto the cathode, the porous separator coating may require a relatively smooth, uniform surface on the cathode and also may require a mechanically strong and flexible cathode layer. For example, for a microporous pseudo-boehmite layer having a xerogel structure, these cathode surface and layer properties may be required to prevent excessive stresses and subsequent cracking of the xerogel layer during drying of a pseudo-boehmite coating on the cathode surface and also during fabrication and use of electrochemical cells containing the pseudo-boehmite layer.

In addition to being porous and being chemically stable to other materials of the electrochemical cell, the separator should be flexible, thin, economical in cost, and have good mechanical strength. These properties are particularly important when a cell with thinner cathode, separator, and anode layers is spirally wound or is folded to increase the surface area of the electrodes and thereby increase the capacity and high rate capability of the cell. Typically, free standing separators for batteries have been 25 microns or greater in thickness. As batteries have continued to evolve to higher volumetric capacities and smaller lightweight structures, there is an increasing need for separators that are 15 microns or less in thickness with a substantial increase in the area of the separator contained in each particular size of battery. Reducing the thickness from 25 microns to 15 microns or less greatly increases the challenge of providing porosity and good mechanical strength while not sacrificing the protection against short circuits or not significantly increasing the total cost of the separator in each battery.

This protection against short circuits is particularly critical in the case of secondary or rechargeable batteries with lithium as the anode active material. During the charging process of the battery, dendrites may form on the surface of the lithium anode and may grow with continued charging. A key feature of the separator in the electrolyte element of lithium rechargeable batteries is that it have small pore structures, such as 1 micron or less in pore diameter, and sufficient mechanical strength to prevent the lithium dendrites from contacting the cathode and causing a short circuit with perhaps a large increase in the temperature of the battery leading to an unsafe explosive condition.

Further it would be advantageous to be able to prepare electrochemical cells having separators with ultrafine pores and a wide range of thicknesses coated in contact to another layer of the electrochemical cell by a process of coating without requiring any subsequent solvent extraction or other complex process which is costly, difficult to control, and not effective in providing interconnected ultrafine pores.

A method for preparing electrochemical cells having a separator, particularly a separator with a thickness less than 15 microns, which can avoid the foregoing problems often encountered with the use of porous polyolefinic and other conventional porous separator materials made using extrusion, extraction, or other conventional processes would be of great value to the battery industry.

SUMMARY OF THE INVENTION

The present invention pertains to methods of preparing a cathode/separator assembly for use in an electrochemical cell, wherein the cathode/separator assembly comprises a cathode active layer and a microporous separator layer, which methods comprise the steps of (a) coating a microporous separator layer on a temporary carrier substrate; (b) coating a cathode active layer in a desired pattern on a surface of the separator layer, which surface is on the side of the separator layer opposite from the temporary carrier substrate; and (c) removing the temporary carrier substrate from the separator layer to form the cathode/separator assembly. In one embodiment, the separator layer comprises one or more microporous xerogel layers. In one embodiment, the cathode/separator assembly further comprises one or more protective coating layers comprising a polymer, wherein the one or more protective coating layers are in contact with at least one of the one or more microporous xerogel layers of the separator layer. In one embodiment, one of the one or more microporous xerogel layers of the separator layer is coated directly on the temporary carrier substrate. In one embodiment, one of the one or more protective coating layers of the cathode/separator assembly is coated directly on the temporary carrier substrate, and one of the one or more microporous xerogel layers of the microporous separator layer is then coated on a surface of the one of the one or more protective coating layers, which surface is on the side of the one of the one or more protective coating layers opposite from the temporary carrier substrate, and further wherein the temporary carrier substrate is removed in step (c) from the surface of the one of the one or more protective coating layers, which surface is on the side of the one of the one or more protective coating layers opposite from the separator layer. In one embodiment, one of the one or more protective coating layers of the cathode/separator assembly is coated after step (a) directly on the surface of the separator layer, which surface is on the side of the separator layer opposite from the temporary carrier substrate layer, prior to coating the cathode active layer in step (b).

In a preferred embodiment of the methods of preparing a cathode/separator assembly of this invention, the separator layer comprises one or more microporous pseudo-boehmite layers. In a more preferred embodiment, the cathode/separator assembly further comprises one or more protective coating layers comprising a polymer, wherein the one or more protective coating layers are in contact with at least one of the one or more microporous pseudo-boehmite layers of the separator layer. In one embodiment, one of the one or more microporous pseudo-boehmite layers of the separator layer is coated directly on the temporary carrier substrate. In one embodiment, one of the one or more protective coating layers of the cathode/separator assembly is coated directly on the temporary carrier substrate, and one of the one or more microporous pseudo-boehmite layers of the microporous separator layer is then coated on a surface of the one of the one or more protective coating layers, which surface of the one of the one or more the protective coating layers is opposite from the temporary carrier substrate, and further wherein the temporary carrier substrate is removed in step (c) from the surface of the one of the one or more protective coating layers, which surface is opposite from the separator layer. In one embodiment, one of the one or more protective coating layers of the cathode/separator assembly is coated after step (a) directly on the surface of one of the one or more microporous pseudo-boehmite layers of the separator layer, prior to coating the cathode active layer in step (b).

In one embodiment of the methods of preparing a cathode/separator assembly of the present invention, the temporary carrier substrate is a flexible web substrate. Suitable web substrates include, but are not limited to, papers, polymeric films, and metals. In one embodiment, the flexible web substrate is surface treated with a release agent.

In one embodiment of the methods of preparing a cathode/separator assembly of this invention, the cathode active layer comprises an electroactive material selected from the group consisting of electroactive metal chalcogenides, electroactive conductive polymers, and electroactive sulfur-containing materials. In one embodiment, the cathode active layer comprises elemental sulfur. In one embodiment, the cathode active layer comprises an electroactive sulfur-containing organic polymer, wherein the polymer, in its oxidized state, comprises one or more polysulfide moieties selected from the group consisting of $-S_m-$, $-S_m^-$, and $S_m^{2-}$; where m is an integer equal to or greater than 3.

In one embodiment of the methods of preparing a cathode/separator assembly of the present invention, the desired pattern of the cathode active layer does not completely coat or cover the surface of the separator layer, which surface is on the side of the separator layer opposite from the temporary carrier substrate.

In one embodiment, the methods further comprise a step of coating an edge insulating layer in a desired pattern on the surface of the separator layer. In one embodiment, the step of coating the edge insulating layer occurs subsequent to the steps of coating the microporous separator and cathode active layers and prior to the step of removing the temporary carrier substrate from the separator layer. In one embodiment, the desired pattern of the edge insulating layer comprises substantially the remaining area of the surface of the separator layer that is not coated with the desired pattern of the cathode active layer. In one embodiment, a portion of the desired pattern of the edge insulating layer is in contact with a portion of the desired pattern of the cathode active layer. In one embodiment, the thickness of the edge insulating layer is substantially the same as the thickness of the cathode active layer. In one embodiment, the step of coating the edge insulating layer occurs subsequent to the step of coating the microporous separator layer and prior to the steps of coating the cathode active layer and removing the temporary carrier substrate from the separator layer. In one embodiment, the edge insulating layer comprises an insulating xerogel layer. In one embodiment, the edge insulating layer comprises an insulating non-porous, polymeric layer.

In one embodiment of the methods of preparing a cathode/separator assembly of this invention, the methods further comprise a step of depositing a cathode current collector layer in a desired pattern on the surface of the cathode active layer, which surface is opposite from the separator layer. In one embodiment, the step of depositing the cathode current collector layer occurs subsequent to the steps of coating the microporous separator and cathode active layers and prior to the step of removing the temporary carrier substrate from the separator layer. In one embodiment, the methods further comprise a step of coating an electrode insulating layer in a desired pattern on the surface of the cathode current collector layer, which surface is opposite from the separator layer.

In one embodiment of the methods of preparing a cathode/separator assembly of the present invention, the methods further comprise a step of depositing a cathode current collector layer in a desired pattern on the outer surface of the cathode active layer and, optionally, on the outer surface of the edge insulating layer. In one embodiment, the step of depositing the cathode current collector layer occurs subsequent to the steps of coating the microporous separator, cathode active, and edge insulating layers, and prior to the step of removing the temporary carrier substrate from the separator layer. In one embodiment, the step of depositing the cathode current collector layer occurs subsequent to the steps of coating the microporous separator and cathode active layers, prior to the step of coating the edge insulating layer, and prior to the step of removing the temporary carrier substrate from the separator layer. In one embodiment, the methods further comprise a step of coating an electrode insulating layer in a desired pattern on the outer surface of the cathode current collector layer and, optionally, on the outer surface of the edge insulating layer.

Another aspect of the present invention pertains to methods of preparing an electrochemical cell, which methods comprise the steps of: (a) providing a cathode/separator assembly prepared by a method comprising the steps of (i) coating a microporous separator layer on a temporary carrier substrate, (ii) coating a cathode active layer in a desired pattern on a surface of the separator layer, which surface is on the side of the separator layer opposite from the temporary carrier substrate, and (iii) removing the temporary carrier substrate from the separator layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in pores of the separator layer; and wherein the separator layer of the cathode/separator assembly and the anode are positioned in a face-to-face relationship and the cathode active layer and the cathode current collector layer are positioned in a face-to-face relationship. In one embodiment, the separator layer comprises one or more microporous xerogel layers. In one embodiment, the cathode/separator assembly further comprises one or more protective coating layers comprising a polymer, wherein the one or more protective coating layers are in contact with at least one of the one or more microporous xerogel layers of the separator layer.

In a preferred embodiment of the methods of preparing an electrochemical cell of this invention, the separator layer comprises one or more microporous pseudo-boehmite layers. In a more preferred embodiment, the electrochemical cell further comprises one or more protective coating layers comprising a polymer, wherein the one or more protective coating layers are in contact with at least one of the one or more microporous pseudo-boehmite layers of the separator layer.

In one embodiment of the methods of preparing an electrochemical cell of this invention, the anode comprises an anode active material selected from the group consisting of lithium metal, lithium-aluminum alloys, lithium-tin alloys, lithium-intercalated carbons, and lithium-intercalated graphites. Suitable electrolytes include liquid electrolytes, gel polymer electrolytes, and solid polymer electrolytes. In one embodiment, the electrolyte comprises a liquid electrolyte.

In one embodiment of the methods of preparing an electrochemical cell of the present invention, the electrode insulating layer comprises a polymeric plastic film. In one embodiment, the electrode insulating layer comprises a polymeric coating.

In one embodiment of the methods of preparing an electrochemical cell of this invention, the cell is a secondary cell. In one embodiment of the methods of preparing an electrochemical cell of this invention, the cell is a primary cell.

Another aspect of the present invention pertains to methods of preparing an electrochemical cell, which methods comprise the steps of: (a) providing a cathode/separator assembly prepared by a method comprising the steps of (i) coating a microporous separator layer on a temporary carrier substrate, (ii) coating a cathode active layer in a desired pattern on a surface of the separator layer, which surface is on the side of the separator layer opposite from the temporary carrier substrate, (iii) coating an edge insulating layer in a desired pattern on the surface of the separator layer, and (iv) removing the temporary carrier substrate from the separator layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in pores of the separator layer; and wherein the separator layer of the cathode/separator assembly and the anode are positioned in a face-to-face relationship, and the cathode active layer and the cathode current collector layer are positioned in a face-to-face relationship.

Another aspect of this invention pertains to methods of preparing an electrochemical cell comprising a casing and a multilayer cell stack, which methods comprise the steps of: (a) providing a laminar combination of (i) an anode assembly comprising an anode comprising an anode active layer, wherein the anode active layer comprises an anode active material comprising lithium; a first cathode current collector layer; and an electrode insulating layer interposed between the anode and the first cathode current collector layer; and (ii) a cathode/separator assembly comprising a cathode active layer in a first desired coating pattern on a surface of a microporous separator layer and with an edge insulating layer in a second desired coating pattern on the surface of the separator layer; wherein the first cathode current collector layer and the cathode active layer are positioned in a face-to-face relationship; (b) winding the laminar combination to form an anode-electrode insulating layer-first cathode current collector layer-cathode/separator assembly multilayer cell stack, wherein the first cathode current collector layer is in contact with the cathode active layer; (c) providing an electrolyte, wherein the electrolyte is contained in pores of the separator layer; (d) providing a casing to enclose the cell stack; and (e) sealing the casing. In one embodiment, the anode further comprises an anode current collector layer interposed between the anode active layer and the electrode insulating layer. In one embodiment, a second cathode current collector layer is deposited in a third desired pattern on the outer surface of the cathode active layer and on the outer surface of the edge insulating layer.

In one embodiment of the methods of preparing an electrochemical cell of this invention, the cathode/separator assembly of step (a) further comprises a temporary carrier substrate on a surface of the separator layer, which surface is on the side of the separator layer opposite from the cathode active layer and the edge insulating layer, and the methods further comprise a step of removing the temporary carrier substrate from the separator layer prior to completion of step (b). In one embodiment, a second cathode current collector layer is deposited in a third desired coating pattern on the outer surface of the cathode active layer and on the outer surface of the edge insulating layer.

In one embodiment of the methods of preparing an electrochemical cell of the present invention of the methods of preparing an electrochemical cell of the present invention, the anode of the anode assembly and the separator layer of the cathode/separator assembly are positioned in a face-to-face relationship in step (a), and a first cathode current collector layer-electrode insulating layer-anode-cathode/separator assembly multilayer cell stack is formed in step (b). In one embodiment, a second cathode current collector layer is deposited in a third desired coating pattern on the outer surface of the cathode active layer and on the outer surface of the edge insulating layer.

In one embodiment of the methods of preparing an electrochemical cell of this invention, the cathode/separator assembly of step (a) further comprises a temporary carrier substrate on a surface of the separator layer, which surface is on the side of the separator layer opposite from the cathode active layer and the edge insulating layer, and the methods further comprise a step of removing the temporary carrier substrate from the separator layer prior to completion of step (b). In one embodiment, a second cathode current collector layer is deposited in a third desired coating pattern on the outer surface of the cathode active layer and on the outer surface of the edge insulating layer.

Another aspect of this invention pertains to methods of preparing an electrochemical cell comprising a casing and a multilayer cell stack, which methods comprise the steps of: (a) providing a laminar combination of (i) an anode assembly comprising an anode comprising lithium metal; and (ii) a cathode/separator assembly comprising a cathode active layer in a first desired coating pattern on a surface of a microporous separator layer and further comprising an edge insulating layer in a second desired coating pattern on the surface of the separator layer; a cathode current collector layer in a third desired coating pattern on the outer surface of the cathode active layer and on the outer surface of the edge insulating layer; an electrode insulating layer in a fourth desired coating pattern on the outer surface of the cathode current collector layer and on the outer surface of the edge insulating layer; wherein the anode and the electrode insulating layer are positioned in a face-to-face relationship; (b) winding the laminar combination to form an anode-electrode insulating layer-cathode current collector layer-cathode/separator assembly multilayer cell stack, wherein the anode is in contact with the separator layer; (c) providing an organic electrolyte, wherein the organic electrolyte is contained in pores of the separator layer; (d) providing a casing to enclose the cell stack; and (e) sealing the casing. In one embodiment, the cathode/separator assembly of step (a) further comprises a temporary carrier substrate on a surface of the separator layer, which surface is on the side of the separator layer opposite from the cathode active layer and the edge insulating layer, and the methods further comprise the step of removing the temporary carrier substrate from the separator layer prior to completion of step (b). In one embodiment, the anode and the separator layer of the cathode/separator assembly are positioned in a face-to-face relationship in step (a), and an anode-cathode/separator assembly-cathode current collector layer-electrode insulating layer multilayer cell stack is formed in step (b).

Another aspect of this invention pertains to cathode/separator assemblies prepared according to the methods of this invention, as described herein. Another aspect of the present invention pertains to electrochemical cells prepared according to the methods of the present invention, as described herein, and comprising a cathode/separator assembly, as described herein.

As will be appreciated by one of skill in the art, features of one aspect or embodiment of the invention are also applicable to other aspects or embodiments of the invention.

DETAILED DESCRIPTION OF THE INVENTION

Figure 1:
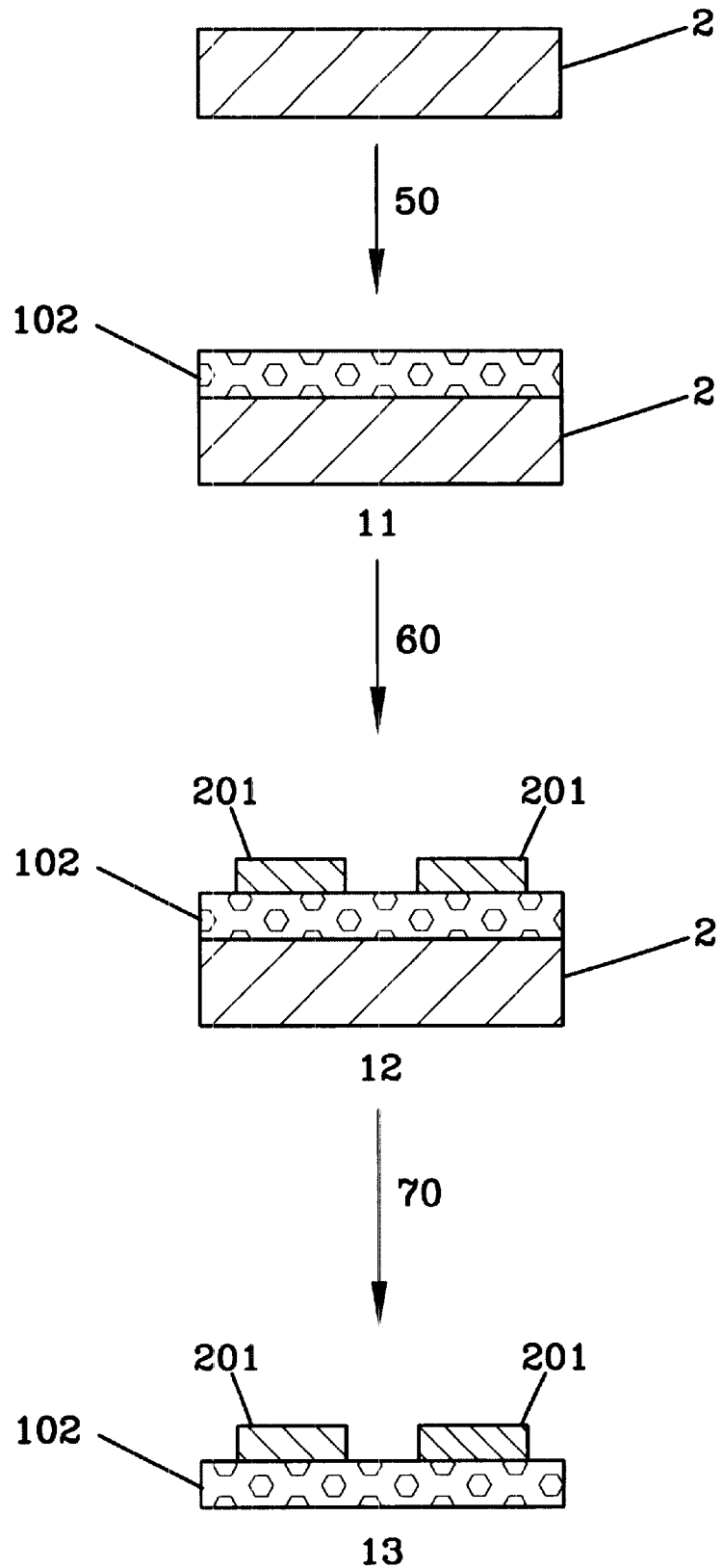
FIG. 1 shows a representative process flow diagram with cross-sectional views of one embodiment of the methods of preparing a cathode/separator assembly of the present invention, which comprises a microporous separator coating step 50, a cathode active layer coating step 60, and a temporary carrier substrate removing step 70.

Many microporous coatings, particularly microporous xerogel coatings which are typically subject to a high level of stresses and potential cracking during drying, formation, and mechanical handling of the three-dimensional gel structure in the microporous layer, are difficult to obtain at the desired quality level when coated on surfaces which are rough and non-uniform or which have poor mechanical strength and flexibility properties. A rough and non-uniform coating surface may cause a wide variation in the thicknesses of microporous coatings applied to this surface. Besides possibly causing the formation of sections of the microporous coating layer which are too thin for the desired application, these thickness variations may interfere with the desired level and uniformity of the microporosity and with the mechanical strength and cracking resistance of the microporous layer. This is particularly true when the thickness of the microporous coating layer is significantly above that needed for the desired application. Also, a coating surface with poor mechanical strength and flexibility may induce, for example, stresses, mechanical failure, poor adhesion, and cracking in a microporous layer coated on this surface. Examples of applications for microporous coatings, including microporous xerogel coatings, where a relatively smooth surface and a mechanically strong layer on which to apply and form the microporous coating would be useful, include, but are not limited to, microporous separators for contact to one or more electrodes of an electrochemical cell; microporous ink jet ink-receptive layers for contact to a wide variety of rough, uneven support surfaces such as papers, fabrics, canvas, and spun-woven plastics; and microporous filtration layers for contact to a wide variety of rough, uneven substrates such as papers. For example, for the product application of microporous separators involving contact to the positive electrode or cathode of an electrochemical cell, the roughness and non-uniformity of the cathode surface prior to coating the microporous separator layer on it may be reduced, for example, by calendering the cathode surface or by applying a thin uniform coating to the cathode surface. However, the reduction of the roughness and non-uniformity of the cathode surface by these approaches may still not be sufficient and also may not prevent undesirable results from poor mechanical strength and flexibility of the cathode and from penetration of the separator coating into porous areas of the cathode during the coating application process.

The present invention overcomes these limitations for preparing microporous coatings for a wide variety of applications, such as separators for use in electrochemical cells, ink jet ink-receptive media, filtration materials, and other product applications. One aspect of the present invention pertains to methods of preparing an electrochemical cell, which methods comprise the steps of (a) coating a microporous separator layer on a temporary carrier substrate, (b) coating a cathode active layer and any other desired layers in desired coating patterns built up on the surface of the separator layer on the side opposite from the temporary carrier substrate, (c) laminating or contacting the cathode/separator assembly resulting from steps (a) and (b) to a desired substrate, such as an anode assembly comprising an anode active a layer, and (d) removing the temporary carrier substrate from the microporous separator layer before step (c) or, alternatively, after step (c). A lamination process similar to that of step (c) may be utilized in step (b) to coat the cathode active layer by a lamination step of applying an assembly comprising the cathode active layer to the surface of the separator layer on the side opposite from the temporary carrier substrate, wherein the cathode active layer has a first surface in contact with the surface of the separator layer and has a second surface on the side opposite from the temporary carrier substrate. In one embodiment of the lamination process in step (b), the assembly comprising the cathode active layer further comprises a second temporary carrier substrate, and wherein, subsequent to step (b), there is a step of removing the second temporary carrier substrate from the assembly comprising the cathode active layer.

The surface of the temporary carrier substrate is selected to have the smoothness, mechanical strength, flexibility, and porosity properties that are desirable for the preparation of the microporous layer by coating on the surface of the substrate and to also have the suitable release properties for removal of the temporary carrier substrate in step (d). This method of applying a microporous layer to a temporary carrier substrate, subsequent coating of one or more other layers overlying the microporous layer, and the subsequent removal of the temporary carrier substrate from the microporous layer is particularly useful when the microporous layer comprises one or more microporous xerogel layers. Besides applications in electrochemical cells, this method may be readily adapted for a wide variety of other product applications, including ink jet ink-receptive media and filtration materials, where microporous coating layers may be utilized.

Methods of Preparing a Cathode/Separator Assembly

One aspect of the present invention pertains to methods of preparing a cathode/separator assembly for use in an electrochemical cell, wherein the cathode/separator assembly comprises a cathode active layer and a microporous separator layer, which methods comprise the steps of (a) coating a microporous separator layer on a temporary carrier substrate, wherein the separator layer has a first surface in contact with the temporary carrier substrate and has a second surface on the side opposite from the temporary carrier substrate; (b) coating a cathode active layer in a desired pattern on the second surface of the separator layer, wherein the cathode active layer has a first surface in contact with the second surface of the separator layer and has a second surface on the side opposite from the separator layer; and (c) removing the temporary carrier substrate from the first surface of the separator layer to form the cathode/separator assembly.

In one embodiment, a lamination step may be utilized in step (b) to coat the cathode active layer by applying an assembly comprising the cathode active layer to the second surface of the separator layer. In one embodiment, in step (b), the assembly comprising the cathode active layer further comprises a second temporary carrier substrate, and wherein, subsequent to step (b), there is a step of removing the second temporary carrier substrate from the assembly comprising the cathode active layer.

One embodiment of this aspect of the present invention is illustrated in FIG. 1. Referring to FIG. 1, in a microporous separator coating step 50, a microporous separator layer 102 is coated onto a surface of a temporary carrier substrate 2 to form composite 11 comprising temporary carrier substrate 2 and microporous separator layer 102. Next, in a cathode active layer coating step 60, a cathode active layer 201 is coated in a desired pattern onto the surface of the microporous separator layer 102 to form composite 12 comprising temporary carrier substrate 2, microporous separator layer 102, and cathode active layer 201. Following this step, in a temporary carrier substrate removing step 70, the temporary carrier substrate 2 is removed from the microporous separator layer 102 of composite 12 to form cathode/separator assembly 13 comprising microporous separator layer 102 and cathode active layer 201.

The term "electrochemical cell," as used herein, pertains to a device that produces an electric current through an electrochemical reaction and that comprises a positive electrode or cathode, a negative electrode or anode, and an electrolyte element interposed between the anode and the cathode, wherein the electrolyte element comprises a separator layer and an aqueous or non-aqueous electrolyte in pores of the separator layer. Electrochemical cells may be primary or secondary cells.

The term "cathode active material," as used herein, pertains to an electrochemically active material used in the cathode active layer of the cathode. As used herein, the term "cathode active layer" pertains to any layer in the cathode of an electrochemical cell which comprises a cathode active material.

The term "anode active material," as used herein, pertains to an electrochemically active material used in the anode active layer of the anode. As used herein, the term "anode active layer" pertains to any layer in the anode of an electrochemical cell which comprises an anode active material.

An electrochemical cell comprising a cathode active layer with the cathode active material in an oxidized state and an anode active layer with the anode active material in a reduced state is referred to as being in a charged state. Discharging an electrochemical cell in its charged state by allowing electrons to flow from the anode to the cathode through an external circuit results in the electrochemical reduction of cathode active material in the cathode and the electrochemical oxidation of anode active material in the anode. To facilitate the efficient flow of electrons through this external circuit, an electrically conductive current collector layer may be placed in contact with the surface of each electrode on the side opposite to the electrolyte element. The term "cathode current collector layer," as used herein, pertains to an electrically conductive current collector layer in contact with the cathode active layer. The term "cathode," as used herein, pertains to the combination of the cathode active layer and the cathode current collector layer. The term "anode current collector layer," as used herein, pertains to an electrically conductive current collector layer in contact with the anode active layer. The term "anode," as used herein, pertains to the combination of the anode active layer and the anode current collector layer, if one is present. These current collectors are useful in efficiently collecting the electrical current generated throughout the respective electrodes and in providing an efficient surface for attachment of the electrical contacts leading to the external circuit.

The term "microporous" as used herein, pertains to the material of a layer, which material possesses pores of diameter of about 1 micron or less which are interconnected in a substantially continuous fashion from one outermost surface of the layer through to the other outermost surface of the layer. The term "microporous separator layer" is used herein to describe a separator layer, which layer may comprise one or more discrete coating layers, where the separator layer as a whole is microporous. Examples of microporous materials useful in the microporous separator layer of the methods of the present invention include, but are not limited to, inorganic xerogel layers or films, inorganic xerogel layers or films further comprising an organic polymer, and organic polymer layers or films that undergo vesiculation or pore formation upon gas formation, for example, by heating or photoirradiating an aromatic diazonium compound or other gas forming compound.

In one embodiment of the methods of preparing a cathode/separator assembly of this invention, the microporous separator layer comprises one or more microporous xerogel layers. By the terms "xerogel layer" and "xerogel structure," as used herein, is meant, respectively, a layer of a coating or the structure of a coating layer in which the layer and structure were formed by drying a liquid sol or sol-gel mixture to form a solid gel matrix as, for example, described in Chem. Mater., Vol. 9, pages 1296 to 1298 (1997) by Ichinose et al. for coating layers of metal-oxide based xerogels. Thus, if the liquid of the gel formed in the liquid sol-gel mixture is removed substantially, for example, though formation of a liquid-vapor boundary phase, the resulting gel layer or film is termed, as used herein, a xerogel layer. As the liquid is removed from the gel in the liquid sol-gel mixture by, for example, evaporation, large capillary forces are exerted on the pores, forming a collapsed structure for the xerogel layer. The pore sizes of the xerogel layer and structure are very small, having average pore diameters less than 300 nm or 0.3 microns.

Thus, the microporous xerogel layer of the methods of this invention comprises a dried microporous three-dimensional solid gel network with pores which are interconnected in a substantially continuous fashion from one outermost surface of the layer through to the other outermost surface of the layer. A continuous xerogel coating layer has the materials of the xerogel in a continuous structure in the coating layer, i.e., the materials are in contact and do not have discontinuities in the structure, such as a discontinuous layer of solid pigment particles that are separated from each other. In contrast, xerogel pigment particles may be formed by a xerogel process involving drying a liquid solution of a suitable precursor to the pigment to form a dried mass of xerogel pigment particles, which is typically then ground to a fine powder to provide porous xerogel pigment particles.

The terms "xerogel coating" and "xerogel coating layer," as used herein, are synonymous with the term "xerogel layer".

The term "binder," as used herein, pertains to inorganic or organic materials which form a continuous structure or film in a substantially continuous fashion from one outermost surface of a coating layer through to the other outermost surface of the coating layer. As such, for example, the xerogel, such as pseudo-boehmite or other metal oxide xerogel, of a xerogel layer is also a binder in addition to having a xerogel structure with ultrafine pores.

A wide variety of materials known to form microporous xerogel layers when coated on a surface may be used to provide the microporous xerogel layers of the separator layers for the methods of the present invention. The electrical conductivity of the microporous separator layer of the methods of the present invention must be low enough to provide the necessary insulating properties for the separator component when used in an electrochemical cell. Thus, for example, a highly electrically conductive material, such as some vanadium oxides, that may form microporous xerogel layers when coated from a sol-gel liquid mixture of a suitable precursor onto a surface may not be suitable in the methods of preparing a cathode/separator assembly of this invention. Suitable materials for use in the microporous xerogel layers of the cathode/separator assembly of the methods of the present invention include, but are not limited to, pseudo-boehmites, zirconium oxides, titanium oxides, aluminum oxides, silicon oxides, and tin oxides.

In a preferred embodiment of the methods of preparing a cathode/separator assembly of this invention, the separator layer comprises one or more microporous pseudo-boehmite layers. Microporous pseudo-boehmite layers for use as separators in electrochemical cells are described in copending U.S. patent application Ser. Nos. 08/995,089 and 09/215,112, both to Carlson et al. of the common assignee, the disclosures of which are fully incorporated herein by reference. The term "pseudo-boehmite," as used herein, pertains to hydrated aluminum oxides having the chemical formula $Al_2O_3 \cdot xH_2O$ wherein x is in the range of from 1.0 to 1.5. Terms, as used herein, which are synonymous with "pseudo-boehmite," include "boehmite," "AlOOH," and "hydrated alumina." The materials referred to herein as "pseudo-boehmite" are distinct from anhydrous aluminas ($Al_2O_3$, such as alpha-alumina and gamma-alumina), and hydrated aluminum oxides of the formula $Al_2O_3 \cdot xH_2O$ wherein x is less than 1.0 or greater than 1.5.

The amount of the pores in a microporous layer may be characterized by the pore volume, which is the volume in cubic centimeters of pores per unit weight of the layer. The pore volume may be measured by filling the pores with a liquid having a known density and then calculated by the increase in weight of the layer with the liquid present divided by the known density of the liquid and then dividing this quotient by the weight of the layer with no liquid present, according to the equation:

$$Pore\ Volume = \frac{[W_1 - W_2]/d}{W_2}$$

where $W_1$ is the weight of the layer when the pores are completely filled with the liquid of known density, $W_2$ is the weight of the layer with no liquid present in the pores, and d is the density of the liquid used to fill the pores. Also, the pore volume may be estimated from the apparent density of the layer by subtracting the reciprocal of the theoretical density of the materials (assuming no pores) comprising the microporous layer from the reciprocal of the apparent density or measured density of the actual microporous layer, according to the equation:

$$Pore\ Volume = \left(\frac{1}{d_1} - \frac{1}{d_2}\right)$$

where $d_1$ is the density of the layer which is determined from the quotient of the weight of the layer and the layer volume as determined from the measurements of the dimensions of the layer, and $d_2$ is the calculated density of the materials in the layer assuming no pores are present or, in other words, $d_2$ is the density of the solid part of the layer as calculated from the densities and the relative amounts of the different materials in the layer. The porosity or void volume of the layer, expressed as percent by volume, can be determined according to the equation:

$$Porosity = \frac{100\ (Pore\ Volume)}{[Pore\ Volume + 1/d_2]}$$

where pore volume is as determined above, and $d_2$ is the calculated density of the solid part of the layer, as described above.

In one embodiment, the microporous xerogel layer of the microporous separator layer of the methods of the present invention has a pore volume from 0.02 to 2.0 $cm^3/g$. In a preferred embodiment, the microporous xerogel layer has a pore volume from 0.3 to 1.0 $cm^3/g$. In a more preferred embodiment, the microporous xerogel layer has a pore volume from 0.4 to 0.7 $cm^3/g$. Below a pore volume of 0.02 cm³/g, the transport of ionic species is inhibited by the reduced pore volume. Above a pore volume of 2.0 cm³/g, the amount of voids are greater which reduces the mechanical strength of the microporous xerogel layer.

In contrast to conventional microporous separators which typically have pore diameters on the order of 0.03 to 2 microns, the microporous xerogel layers of the microporous separator layer of the methods of the present invention have pore diameters which range from about 0.3 microns down to less than 0.002 microns. In one embodiment, the microporous xerogel layer has an average pore diameter from 0.001 microns or 1 nm to 0.3 microns or 300 nm. In a preferred embodiment, the microporous xerogel layer has an average pore diameter from 0.001 microns or 1 nm to 0.030 microns or 30 nm. In a more preferred embodiment, the microporous xerogel layer has an average pore diameter from 0.003 microns or 3 nm to 0.010 microns or 10 nm.

One distinct advantage of separators with much smaller pore diameters on the order of 0.001 to 0.03 microns is that insoluble particles, even colloidal particles with diameters on the order of 0.05 to 1.0 microns, can not pass through the separator because of the ultrafine pores. In contrast, colloidal particles, such as conductive carbon powders often incorporated into cathode active layer compositions, may readily pass through conventional separators, such as microporous polyolefins, and thereby may migrate to undesired areas of the cell.

Another significant advantage of the microporous separator layer comprising a microporous xerogel layer of the methods of the present invention, in comparison to conventional separators, is that the nanoporous structure of the xerogel layer may function as an ultrafiltration membrane and, in addition to blocking all particles and insoluble materials, may block or significantly inhibit the diffusion of soluble materials of relatively low molecular weights, such as 2,000 or higher, while permitting the diffusion of soluble materials with molecular weights below this cutoff level. This property may be utilized to advantage in coating the cathode active layer and other layers onto the surface of the separator layer by preventing any undesired penetration of pigments and other materials into the separator layer. This property may also be utilized to advantage in selectively impregnating or imbibing materials into the separator layer during manufacture of the electrochemical cell or in selectively permitting diffusion of very low molecular weight materials through the separator layer during all phases of the operation of the cell while blocking or significantly inhibiting the diffusion of insoluble materials or of soluble materials of medium and higher molecular weights.

Another important advantage of the extremely small pore diameters of the microporous xerogel layer of the separator layer of the methods of the present invention is the strong capillary action of the tiny pores in the xerogel layer which enhances the capability of the microporous separators to readily take up or imbibe electrolyte liquids and to retain these materials in pores within the separator layer.

The microporous separator layers of the methods of this invention may optionally further comprise a variety of binders (in addition to the binder, such as for example a pseudo-boehmite xerogel, that provides the primary microporous structure of the separator layer), to improve the mechanical strength and other properties of the layer, as for example, described for microporous pseudo-boehmite xerogel layers in the two aforementioned copending U.S. patent application Ser. Nos. 08/995,089 and 09/215,112 now U.S. Pat. No. 6,306,545, both to Carlson et al. of the common assignee. Any binder that is compatible with the microporous material of the separator layer may be used. For microporous xerogel layers, any binder that is compatible with the xerogel precursor sol during mixing and processing into the microporous xerogel layer and provides the desired mechanical strength and uniformity of the layer without significantly interfering with the desired microporosity is suitable for use. The preferred amount of binder is from 5% to 70% of the weight of the xerogel-forming material in the layer. Below 5 weight per cent, the amount of binder is usually too low to provide a significant increase in mechanical strength. Above 70 weight per cent, the amount of binder is usually too high and fills the pores to an excessive extent, which may interfere with the microporous properties and with the transport of low molecular weight materials through the layer. The binder may be inorganic, for example, another xerogel-forming material, such as silicas, gamma aluminum oxides, and alpha aluminum oxides, that are known to be compatible with the primary xerogel-forming material, such as pseudo-boehmite, present in the microporous layer, for example, as is known in the art of ink-receptive microporous xerogel layers for ink jet printing. In one embodiment, the binders in the microporous xerogel layer are organic polymer binders. Examples of suitable binders include, but are not limited to, polyvinyl alcohols, cellulosics, polyvinyl butyrals, urethanes, polyethylene oxides, copolymers thereof, and mixtures thereof. Binders may be water soluble polymers and may have ionically conductive properties. Suitable binders may also comprise plasticizer components such as, but not limited to, low molecular weight polyols, polyalkylene glycols, and methyl ethers of polyalkylene glycols to enhance the coating, drying, and flexibility of the microporous xerogel layer.

The thickness of the microporous separator layer of the methods of the present invention may vary over a wide range since the basic properties of microporosity and mechanical integrity are present in layers of a few microns in thickness as well as in layers with thicknesses of hundreds of microns. The microporous separator layer may be coated in a single coating application or in multiple coating applications to provide the desired overall thickness. For various reasons including cost, overall performance properties of the microporous separator layer, and ease of manufacturing, the desirable overall thicknesses of the microporous separator layer are in the range of 1 micron to 25 microns. Preferred are thicknesses in the range of 1 micron to 20 microns. More preferred are thicknesses in the range of 5 to 15 microns. Conventional separators, such as the porous polyolefin materials, are typically 25 to 50 microns in thickness so it is particularly advantageous that the microporous separator layers of this invention can be effective and inexpensive at thicknesses below 15 microns.

In the methods of preparing a cathode/separator assembly of the present invention, the temporary carrier substrate functions as a temporary support to the superposed layers during the process steps of this invention and may be any web or sheet material possessing suitable smoothness, flexibility, dimensional stability, and adherence properties to the cathode/separator assembly. In one embodiment of the methods of preparing a cathode/separator assembly of the present invention, the temporary carrier substrate is a flexible web substrate. Suitable web substrates include, but are not limited to, papers, polymeric films, and metals. A typical flexible polymeric film for use as the temporary carrier substrate is a polyethylene terephthalate film. In a preferred embodiment, the flexible web substrate is surface treated with a release agent to enhance desired release characteristics, such as by treatment with a silicone release agent and the like. This surface treatment or coating with a release agent of the temporary carrier substrate may be done on a multistation coating machine in the same coating pass as that used to later apply the first layer of the cathode/separator assembly in the methods of this invention. Thus for example, referring to FIG. 1, in one embodiment of the methods of the present invention, the coating step of coating the temporary carrier substrate with a release agent would occur prior to the microporous separator coating step 50. Examples of suitable flexible web substrates include, but are not limited to, resin-coated papers such as papers on which a polymer of an olefin containing 2 to 10 carbon atoms, such as polyethylene, is coated or laminated; and transparent or opaque polymeric films such as polyesters, polypropylene, polystyrene, polycarbonates, polyvinyl chloride, polyvinyl fluoride, polyacrylates, and cellulose acetate.

The temporary carrier substrate may be of a variety of thicknesses, such as, for example, thicknesses in the range of 2 to 100 microns. Since the temporary carrier substrate is subsequently removed from the cathode/separator assembly and is not present in the electrochemical cell comprising the cathode/separator assembly, the temporary carrier substrate may be thicker than the 2 to 3 micron thickness for an electrochemically inactive substrate of the electrodes which is normally desired to maximize the amount of electroactive materials in the cell. Thus, one benefit of the methods of this invention is the capability of coating the separator layer and the cathode active layer on a relatively thick substrate, such as a 12 to 25 micron thick polyethylene terephthalate film, instead of being limited to a 2 or 3 micron substrate, or even a 6 micron substrate. Thinner substrates of 6 microns or less are more difficult to coat and dry for mechanical handling and dimensional stability reasons, especially with relatively thick separator layer and cathode active layer coatings which often are coated from water or other high-boiling liquids.

Another benefit is that the temporary carrier substrate, after its removal from the cathode/separator assembly, may be reused for preparing another cathode/separator assembly, may be reused for another product application, or may be reclaimed and recycled. Any such reuses combine to lower the effective cost of the temporary carrier substrate in preparing the cathode/separator assembly.

In one embodiment of the methods of preparing a cathode/separator assembly of this invention, the cathode active layer of the cathode comprises an electroactive material selected from the group consisting of electroactive metal chalcogenides, electroactive conductive polymers, and electroactive sulfur-containing materials. As used herein, the term "chalcogenides" pertains to compounds that contain one or more of the elements of oxygen, sulfur, and selenium. The cathode active layer of the cathode/separator assembly of the methods of the present invention may be coated in a single coating step, or, alternatively, the cathode active layer may be coated in multiple coating steps to provide the desired overall thickness. The preparation of the cathode active layer may comprise other processing steps as known in the art of cathode active coatings, such as, for example, calendering. The cathode active layer of the cathode/separator assembly of the methods of the present invention may further comprise one or more other non-electroactive components such as polymeric binders, electrically conductive materials, ionically conductive materials, non-electroactive metal oxides, and other additives known in the art.

The thickness of the cathode active layer may vary widely depending on the type and thickness of the anode active layer and on the type and weight per cent of the cathode active material in the cathode active layer. Typical thicknesses are in the range of 5 to 200 microns with the cathode active layer more typically having a thickness of 10 to 30 microns.

Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. Preferred transition metal chalcogenides are the electroactive oxides of nickel, manganese, cobalt, and vanadium. In one embodiment, the cathode active layer comprises an electroactive conductive polymer. Examples of suitable conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

Preferred cathode active materials are those comprising electroactive sulfur-containing materials. The term "electroactive sulfur-containing material," as used herein, pertains to cathode active materials which comprise the element sulfur in any form, wherein the electrochemical activity involves the breaking or forming of sulfur-sulfur covalent bonds. The nature of the electroactive sulfur-containing materials useful in the cathode active layers of this invention may vary widely. The electroactive properties of elemental sulfur and of other sulfur-containing materials are known in the art, and typically include the reversible formation of lithiated or lithium ion sulfides during the discharge or cathode reduction cycle of the battery.

In one embodiment, the cathode active layer comprises elemental sulfur.

In one embodiment, the cathode active layer comprises an electroactive sulfur-containing material that is organic, that is, it comprises both sulfur atoms and carbon atoms.

In one embodiment, the electroactive sulfur-containing material is polymeric. In one embodiment, the cathode active layer comprises an electroactive sulfur-containing organic polymer, wherein the sulfur-containing organic polymer, in its oxidized state, comprises one or more polysulfide moieties, $S_m$, selected from the group consisting of covalent —$S_m$— moieties, ionic —$S_m^-$ moieties, and ionic $S_m^{2-}$ moieties, where m is an integer equal to or greater than 3 and is the same or different at each occurrence, as, for example, described in copending U.S. patent application Ser. Nos. 09/565,184 pending and 09/565,187 pending to Kovalev et al. and Movchan et al., respectively, of the common assignee, the disclosures of which are fully incorporated herein by reference. In a discharged state, an electroactive sulfur-containing organic polymer is in an electrochemically reduced state and, when polysulfide moieties are present in the polymer, the polymer typically forms ionic organic polysulfides and sulfides along with some inorganic polysulfides and sulfides during discharge. The microporous xerogel layers, such as pseudo-boehmite xerogel layers, may be beneficial in controlling the concentration of these ionic species and their diffusion to the anode as, for example, described in copending U.S. patent application Ser. No. 08/995,089 to Carlson et al. of the common assignee. In one embodiment, m of the polysulfide moiety, $S_m$, of the sulfur-containing organic polymer is an integer equal to or greater than 9 and is the same or different at each occurrence. In one embodiment, m of the polysulfide moiety, $S_m$, of the sulfur-containing organic polymer is an integer equal to or greater than 24 and is the same or different at each occurrence. In one embodiment, the polysulfide moiety, $S_m$, is covalently bonded by one or both of its terminal sulfur atoms as a side group on the polymer backbone chain of the sulfur-containing organic polymer. In one embodiment, the polysulfide moiety, $S_m$, comprises a covalent —$S_m$— moiety, which covalent —$S_m$— moiety is incorporated by covalent bonds to both of its terminal sulfur atoms into the polymer backbone chain of the sulfur-containing organic polymer.

Examples of electroactive sulfur-containing organic polymers include, but are not limited to, those comprising one or more carbon-sulfur polymers of general formulae $(CS_x)_n$ and $(C_2S_z)_n$. Compositions comprising the general formula —$(CS_x)_n$— (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al. Additional examples of electroactive sulfur-containing polymers include those compositions comprising the general formula —$(C_2S_z)_n$— (formula II) wherein z ranges from greater than 1 to about 100, and n is equal to or greater than 2, as described in U.S. Pat. No. 5,529,860 and copending U.S. patent application Ser. No. 08/602,323 now abandoned, both to Skotheim et al. of the common assignee. The preferred materials of general formulae I and II, in their oxidized states, comprise a polysulfide moiety of the formula, —$S_m$—, wherein m is an integer equal to or greater than 3 and is the same or different at each occurrence.

The backbone of electroactive sulfur-containing polymers may comprise polysulfide —$S_m$— main chain linkages along with the presence of covalently bound —$S_m$— side groups. Owing to the presence of multiple linked sulfur atoms, —$S_m$—, where m is an integer equal to or greater than 3, in these materials, they possess significantly higher energy densities than corresponding materials containing disulfide linkages, —S—S—, alone.

Other preferred electroactive sulfur-containing polymers include those described in copending U.S. patent application Ser. No. 08/995,122 now U.S. Pat. No. 6,201,100 to Gorkovenko et al. of the common assignee and U.S. Pat. No. 5,723,230 to Naoi.

Other examples of electroactive sulfur-containing polymers comprising a polysulfide moiety, $S_m$, where m is an integer that is equal to or greater than 3, are one-dimensional electron conducting polymers containing at least one polysulfurated chain forming a charge transfer complex with the polymer, as described in U.S. Pat. No. 4,664,991 to Perichaud et al.

Other examples of electroactive sulfur-containing polymers include organo-sulfur materials comprising disulfide linkages, although their low specific capacity compared to the corresponding materials containing polysulfide linkages makes it difficult to achieve the desired high capacities in electrochemical cells. However, they may also be utilized in a blend in the cathode active layer with elemental sulfur and/or with sulfur-containing polymers comprising one or more polysulfide moieties and may contribute by their electrochemical properties, their chemical interactions with lithium polysulfides and lithium sulfides generated during cycling of the cells, and, optionally, their melting properties, to achieving the desired high capacities in electrochemical cells. Examples of electroactive sulfur-containing materials comprising disulfide groups include those described in U.S. Pat. No. 4,739,018 to Armand et al.; U.S. Pat. Nos. 4,833,048 and 4,917,974, both to DeJonghe et al.; U.S. Pat. Nos. 5,162,175 and 5,516,598, both to Visco et al.; and U.S. Pat. No. 5,324,599 to Oyama et al.

Yet further examples of electroactive sulfur-containing materials include those described in U.S. Pat. Nos. 4,143,214 and 4,152,491 to Chang et al.

The relative amounts of electroactive cathode active material, such as sulfur-containing organic polymer, and other components such as conductive additives, polymeric binders, electrolytes, and other additives in the cathode active layer may vary widely. Generally these relative amounts are determined by experimentation and chosen so as to optimize the amount of cathode active material present, the energy storage capacity of the cathode active layer, and the electrochemical performance of the cathode active layer in an electrochemical cell.

Electroactive sulfur-containing organic polymers for the cathode active layers of the methods of the present invention typically have elemental compositions containing between about 45 weight per cent and 98 weight per cent of sulfur. In one embodiment, the sulfur-containing organic polymer comprises greater than 75 weight per cent of sulfur, and, preferably, greater than 86 weight per cent of sulfur, and, most preferably, greater than 90 weight per cent of sulfur.

Figure 2:
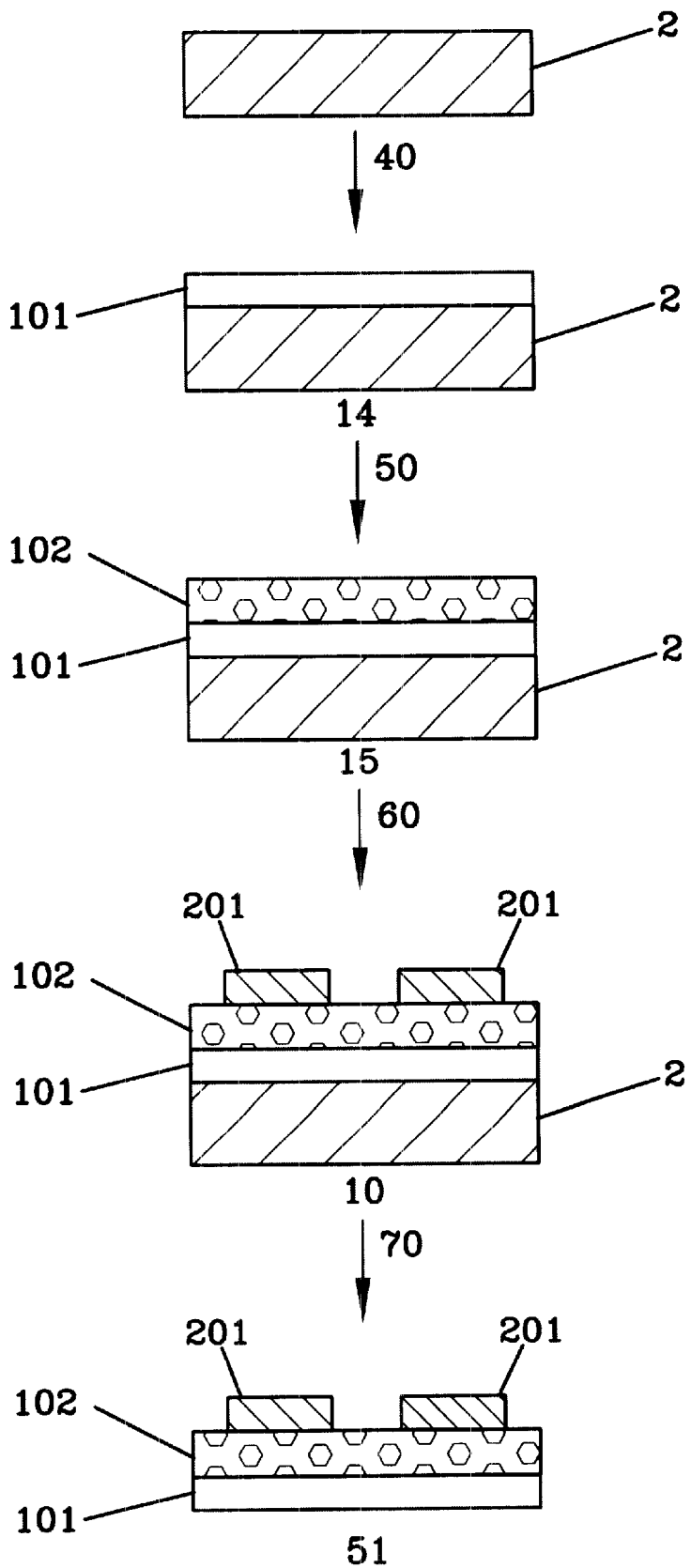
FIG. 2 shows a representative process flow diagram with cross-sectional views of one embodiment of the methods of preparing a cathode/separator assembly of the present invention, which comprises a protective coating layer step 40, a microporous separator coating step 50, a cathode active layer coating step 60, and a temporary carrier substrate removing step 70.

In one embodiment of the methods of preparing a cathode/separator assembly of the present invention, the cathode/separator assembly further comprises one or more protective coating layers comprising a polymer, wherein the one or more protective coating layers are in contact with at least one of the one or more microporous layers of the separator layer. In one embodiment, as illustrated in FIG. 2, one of the one or more protective coating layers of the cathode/separator assembly is coated directly on the temporary carrier substrate prior to coating the microporous separator layer. Referring to FIG. 2, in a protective coating layer step 40, a protective coating layer 101 is coated onto a surface of a temporary carrier substrate 2 to form a composite 14 comprising temporary carrier substrate 2 and protective coating layer 101. Next, in a microporous separator coating step 50, a microporous separator layer 102 is coated onto the outer surface of the protective coating layer 101 to form composite 15 comprising temporary carrier substrate 2, protective coating layer 101, and microporous separator layer 102. Following this, in a cathode active layer coating step 60, a cathode active layer 201 is coated in a desired pattern onto the outer surface of the microporous separator layer 102 to form composite 10 comprising temporary carrier substrate 2, protective coating layer 101, microporous separator layer 102, and cathode active layer 201. Following this step 60, in a temporary carrier substrate removing step 70, the temporary carrier substrate 2 is removed from the protective coating layer 101 of composite 10 to form cathode/separator assembly 51 comprising protective coating layer 101, microporous separator layer 102, and cathode active layer 201.

Figure 3:
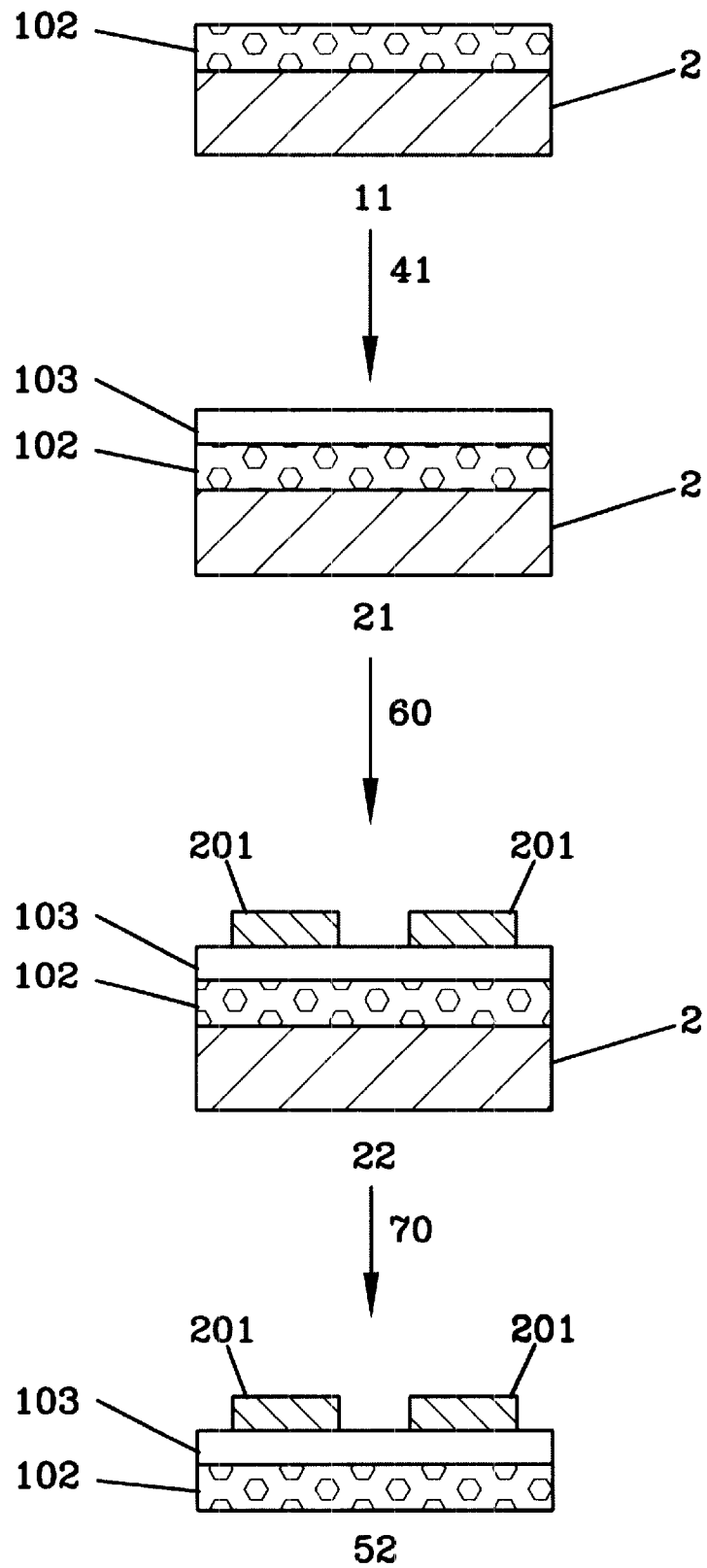
FIG. 3 shows a representative process flow diagram with cross-sectional views of one embodiment of the methods of preparing a cathode/separator assembly of this invention, which further comprises a protective coating layer step 41 prior to the cathode active layer coating step 60, in comparison to the embodiment illustrated in FIG. 1.

In another embodiment of the methods of preparing a cathode/separator assembly of this invention, one of the one or more microporous layers of the separator layer is coated directly on the temporary carrier substrate and one of the one or more protective coating layers is coated directly onto the one of one or more microporous layers, as illustrated in FIG. 3. Referring to FIG. 3, in a protective coating layer coating step 41, a protective coating layer 103 is coated onto the outer surface of a microporous separator layer 102 of composite 11 comprising microporous separator layer 102 and temporary carrier substrate 2, which composite 11 may be prepared by the method illustrated in FIG. 1. This step 41 forms composite 21 comprising protective coating layer

103, microporous separator layer 102, and temporary carrier substrate 2. Next, in a cathode active layer coating step 60, a cathode active layer coating 201 is coated in a desired pattern onto the surface of the protective coating layer 103 to form composite 22 comprising cathode active layer 201, protective coating layer 103, microporous separator layer 102, and temporary carrier substrate 2. Following this, in a temporary carrier substrate removing step 70, the temporary carrier substrate 2 is removed from the microporous separator layer 102 of composite 22 to form cathode/separator assembly 52 comprising cathode active layer 201, protective coating layer 103, and microporous separator layer 102.

Figure 4:
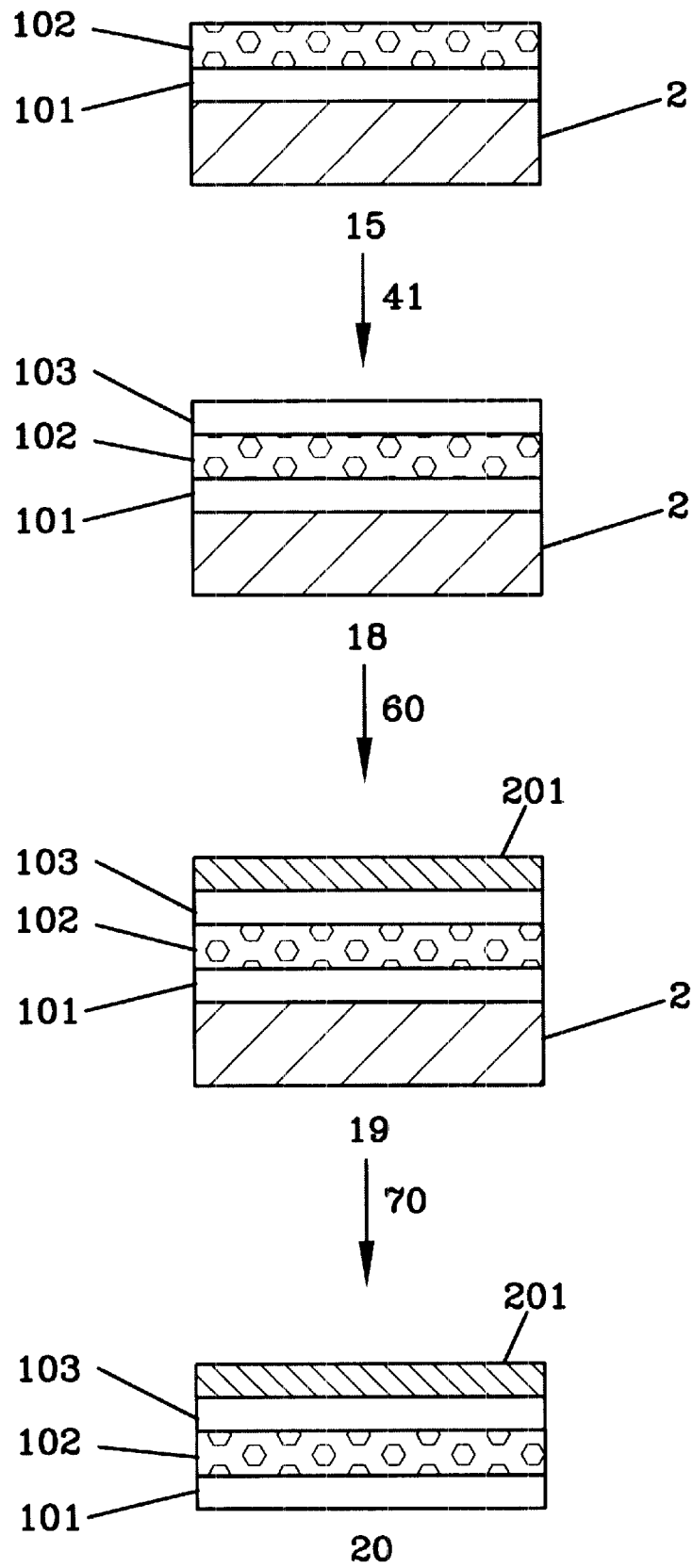
FIG. 4 shows a representative process flow diagram with cross-sectional views of one embodiment of the methods of preparing a cathode/separator assembly of this invention, which further comprises a protective coating layer step 41 prior to the cathode active layer coating step 60, in comparison to the embodiment illustrated in FIG. 2.

In another embodiment of the methods of preparing a cathode/separator assembly of the present invention, a first protective coating layer of the one or more protective coating layers of the cathode/separator assembly is coated directly on the temporary carrier substrate, one of the one or more microporous layers of the separator layer is coated directly on this first protective coating layer, and a second protective coating layer of the one or more protective coating layers of the cathode/separator assembly is coated directly on this microporous layer, as illustrated in FIG. 4. Referring to FIG. 4, in a protective coating layer coating step 41, a protective coating layer 103 is coated onto the outer surface of the microporous separator layer 102 of composite 15 comprising microporous separator layer 102, protective coating layer 101, and temporary carrier substrate 2, which composite 15 may be prepared by the method illustrated in FIG. 2. This step 41 forms composite 18 comprising protective coating layer 103, microporous separator layer 102, protective coating layer 101, and temporary carrier substrate 2. Next, in a cathode active layer coating step 60, a cathode active layer 201 is coated in a desired pattern onto the outer surface of the protective coating layer 103 to form composite 19 comprising cathode active layer 201, protective coating layer 103, microporous separator layer 102, protective coating layer 101, and temporary carrier substrate 2. Following this, in a temporary carrier substrate removing step 70, the temporary carrier substrate 2 is removed from the protective coating layer 101 of composite 19 to form cathode/separator assembly 20 comprising cathode active layer 201, protective coating layer 103, microporous separator layer 102, and protective coating layer 101.

In a preferred embodiment of the methods of preparing a cathode/separator assembly of the present invention, the microporous separator layer comprises one or more microporous pseudo-boehmite xerogel layers, and more preferably, the cathode/separator assembly further comprises one or more protective coating layers comprising a polymer, wherein the one or more protective coating layers are in contact with at least one of the one or more microporous pseudo-boehmite xerogel layers. In one embodiment, one of the one or more microporous pseudo-boehmite xerogel layers of the separator layer is coated directly on the temporary carrier substrate. In one embodiment, one of the one or more protective coating layers of the cathode/separator assembly is coated directly on the temporary carrier substrate.

The incorporation of one or more protective coating layers in the cathode/separator assembly of the methods of this invention enhances the mechanical strength and adds flexibility to microporous separator layers comprising one or more microporous layers, particularly those separator layers comprising one or more microporous xerogel layers.

The term "monomer" is used herein to describe moieties which have a reactive moiety and are capable of reacting to form a polymer. The term "polymer" is used herein to describe molecules that have two or more repeating moieties formed from a monomer moiety. The term "macromonomer" is used herein to describe polymers with molecular weights from several hundreds to tens of thousands with a functional group at a chain end that may be polymerized. The polymer of the one or more protective coating layers of the cathode/separator assembly of the methods of the present invention comprises one or more moieties from the polymerization of one or more monomers or macromonomers. Examples of suitable monomers or macromonomers include, but are not limited to, acrylates, methacrylates, olefins, epoxides, and vinyl ethers. Further examples of suitable monomers or macromonomers for forming the polymer of the protective coating layer include, but are not limited to, those described in U.S. patent application Ser. No. 09/215,029 now U.S. Pat. No. 6,194,098 by Ying et al. of the common assignee, the disclosure of which is fully incorporated herein by reference.

The molecular weight of the polymer of the one or more protective coating layers is preferably greater than 10,000. More preferred is a polymer of molecular weight greater than 50,000.

The thickness of the one or more protective coating layers of the cathode/separator assembly of the methods of this invention may vary over a wide range from about 0.2 microns to about 20 microns. In a preferred embodiment, the protective coating layer has a thickness of from about 0.5 microns to about 15 microns. More preferred is a thickness of from about 0.5 microns to about 10 microns, and even more preferred is a thickness of from about 0.5 microns to about 5 microns, especially when multiple protective coating layers are present. Conventional separators, such as polyolefin materials, are typically 25 to 50 microns in thickness so it is particularly advantageous that the protective coating layer coated microporous separator layers of the methods of this invention can be effective and inexpensive at overall thicknesses below 15 microns. In other words, it is preferable that the combined thickness of the one or more microporous layers, such as microporous xerogel layers, and the one or more protective coating layers be below 15 microns.

The one or more protective coating layers comprising a polymer of the cathode/separator assembly of the methods of this invention may further comprise a pigment. Suitable pigments for use in the one or more protective coating layers include, but are not limited to, colloidal silicas, amorphous silicas, surface treated silicas, colloidal aluminas, amorphous aluminas, conductive carbons, tin oxides, titanium oxides, and polyethylene beads. Preferred pigments for use in the one or more protective coating layers are colloidal silicas, amorphous silicas, surface treated silicas, or combinations thereof. Surface treated silicas, including hydrophobic silicas, are especially preferred.

The weight ratio of the polymer to the pigment in the one or more protective coating layers may vary from about 1:10 to about 10:1. In a preferred embodiment, the polymer and the pigment are present in the one or more protective coating layers at a weight ratio of from about 1:4 to about 6:1. In a more preferred embodiment, the polymer and the pigment are present in the one or more protective coating layers at a weight ratio of from about 1:3 to about 4:1.

The particle size or diameter of the pigment is preferably larger than the average pore diameter of the one or more microporous layers of the separator layer so that the pigment does not penetrate pores of the microporous separator layer, in those cases where the protective coating layer comprises a pigment and is coated directly onto a microporous separator layer. The particle size of the pigment may range from about 10 nm to about 10,000 nm. In a preferred embodiment, the pigment has a particle size from about 20 nm to about 6,000 nm. In a most preferred embodiment, the pigment has a particle size from about 50 nm to about 3,000 nm.

In addition to polymer and pigments, the one or more protective coating layers of the cathode/separator assembly of the methods of the present invention may further comprise other additives as are known in the art of coatings, especially those known for use in flexible and durable coatings. Examples of other coating additives include, but are not limited to, photosensitizers for radiation curing of any monomers and macromonomers present; catalysts for non-radiation curing of any monomers, macromonomers, or polymers present; crosslinking agents such as zirconium compounds, aziridines, and isocyanates; surfactants; plasticizers; dispersants; flow control additives; and rheology modifiers.

The microporous separator layer of the cathode/separator assembly of the methods of the present invention may have more than one microporous layer. Also, the cathode/separator assembly of the methods of the present invention may have more than one protective coating layer, for example, as illustrated in FIG. 4. The compositions of these multiple microporous layers of the separator layer may be the same or different for each such layer in the cathode/separator assembly. Also, the compositions of these multiple protective coating layers may be the same or different for each such layer in the cathode/separator assembly. The many possible combinations of microporous layers and protective coating layers also include a protective coating layer intermediate between two microporous layers.

The methods of the present invention may further include coating a cathode membrane layer or other ion-conducting layer between the separator layer and the cathode active layer. Examples of cathode membrane layers are described, for example, in U.S. Pat. No. 5,919,587 to Mukheijee et al.

In one embodiment of the methods of preparing a cathode/separator assembly of the present invention, the desired pattern for coating the cathode active layer over the surface of the microporous separator layer may be full coverage of the cathode active layer over the surface of the separator layer or alternatively, the cathode active layer may not completely coat the surface of the separator layer. In one embodiment, the desired coating pattern of the cathode active layer completely coats the surface of the separator layer directly or indirectly, for example, as illustrated in FIG. 4, where cathode active layer 201 completely coats the surface of protective coating layer 103 which in turn completely coats the surface of microporous separator 102, thus providing indirect complete coverage of the cathode active layer over the surface of the separator layer. In one embodiment, the desired coating pattern of the cathode active layer does not completely coat the surface of the separator layer directly or indirectly, for example, as illustrated in FIGS. 1 to 3, 5 to 7, 8A, 8B, 9A, 9B, and 10 to 12. This absence of full coverage of the cathode active layer directly over the surface of the microporous separator layer or, alternatively, indirectly over the surface of a protective coating layer which is over the microporous separator layer may be beneficial to allow the coating of edge insulating layers in desired patterns on the separator layer and in contact with a portion of the cathode active layer to reduce the possibility of short-circuiting of the electrodes when fabricated into an electrochemical cell. This is also typically consistent with cutting or slitting or otherwise converting the cathode/separator assembly, as originally coated, to a smaller size or dimension for fabrication into an electrochemical cell, for example, as illustrated in FIGS. 5, 8A, 8B, 9A, 9B, and 10 to 12.

Figure 5:
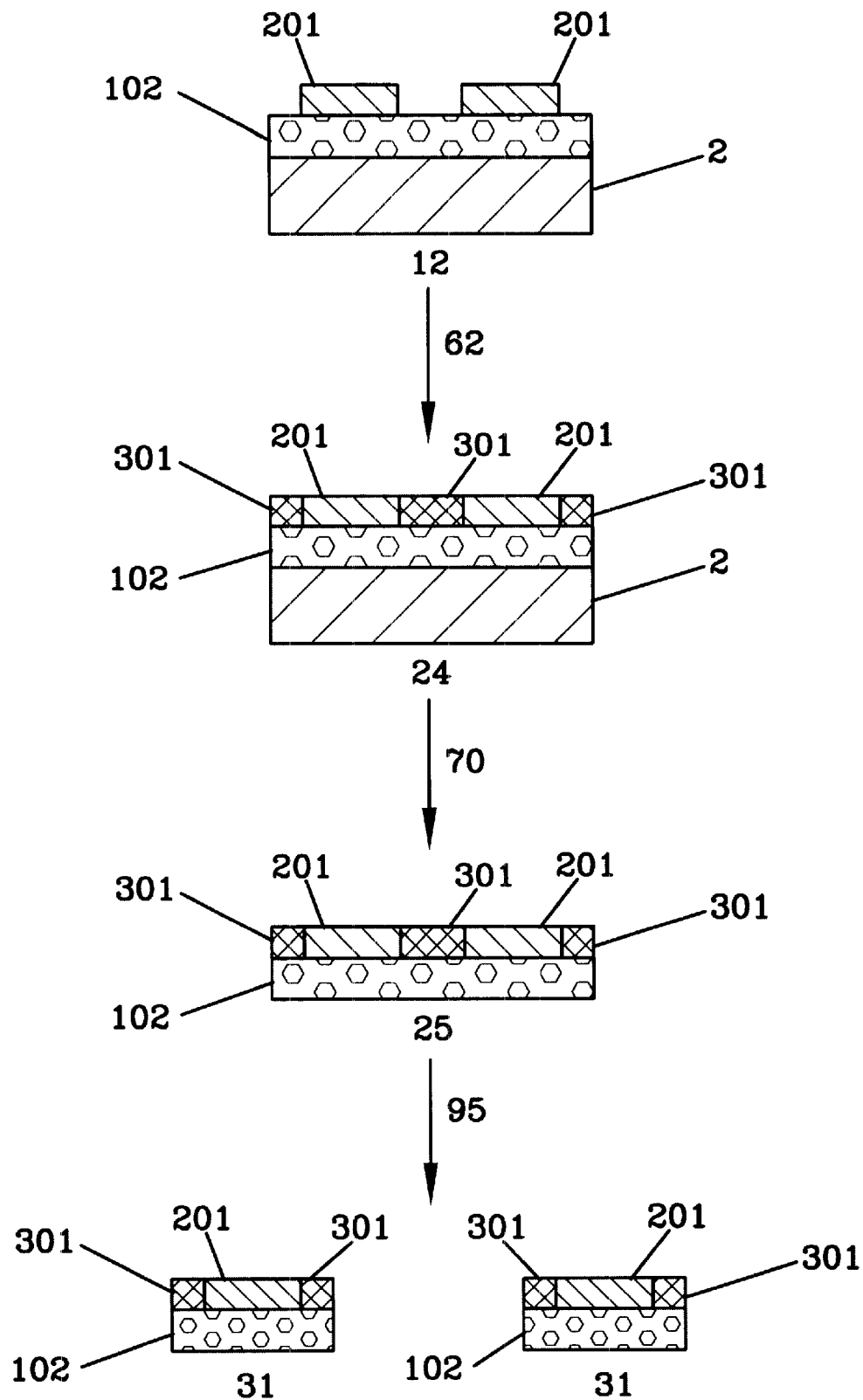
FIG. 5 shows a representative process flow diagram with cross-sectional views of one embodiment of the methods of preparing a cathode/separator assembly of the present invention, which further comprises an edge insulating layer coating step 62 subsequent to the cathode active layer coating step 60 and also comprises a slitting step 95 subsequent to the temporary carrier substrate removal step 70, in comparison to the embodiment illustrated in FIG. 1.

In one embodiment of the methods of preparing a cathode/separator assembly of the present invention, the methods further comprise the step of coating an edge insulating layer in a desired pattern on the surface of the microporous separator layer. In one embodiment, the step of coating the edge insulating layer occurs subsequent to the microporous separator coating step and the cathode active layer coating step and prior to the temporary carrier substrate removing step, for example, as illustrated in FIG. 5. Referring to FIG. 5, in an edge insulating layer coating step 62, an edge insulating layer 301 is coated onto the outer surface of the microporous separator layer 102 of composite 12 comprising cathode active layer 201, microporous separator layer 102, and temporary carrier substrate 2, which composite 12 may be prepared by the method illustrated in FIG. 1. This forms composite 24 comprising cathode active layer 201, edge insulating layer 301, microporous separator layer 102, and temporary carrier substrate 2. Next, in a temporary carrier substrate removing step 70, the temporary carrier substrate 2 is removed from the microporous separator layer 102 of composite 24 to form cathode/separator assembly 25 comprising cathode active layer 201, edge insulating layer 301, and microporous separator layer 102. If a smaller dimension is desired for the cathode/separator assembly 53, it may be slit or cut or otherwise converted to the desired smaller dimension in a slitting step 95 to form multiples of cathode/separator assembly 31 comprising cathode active layer 201, edge insulating layer 301, and microporous separator layer 102.

In one embodiment, the desired pattern of the edge insulating layer comprises substantially the remaining area of the surface of the microporous separator layer that is not coated with the desired pattern of the cathode active layer, for example, as illustrated in FIG. 5. The edge insulating layer may be coated in a variety of desired patterns, for example, it may be coated on only one edge of the cathode active layer.

Figure 6:
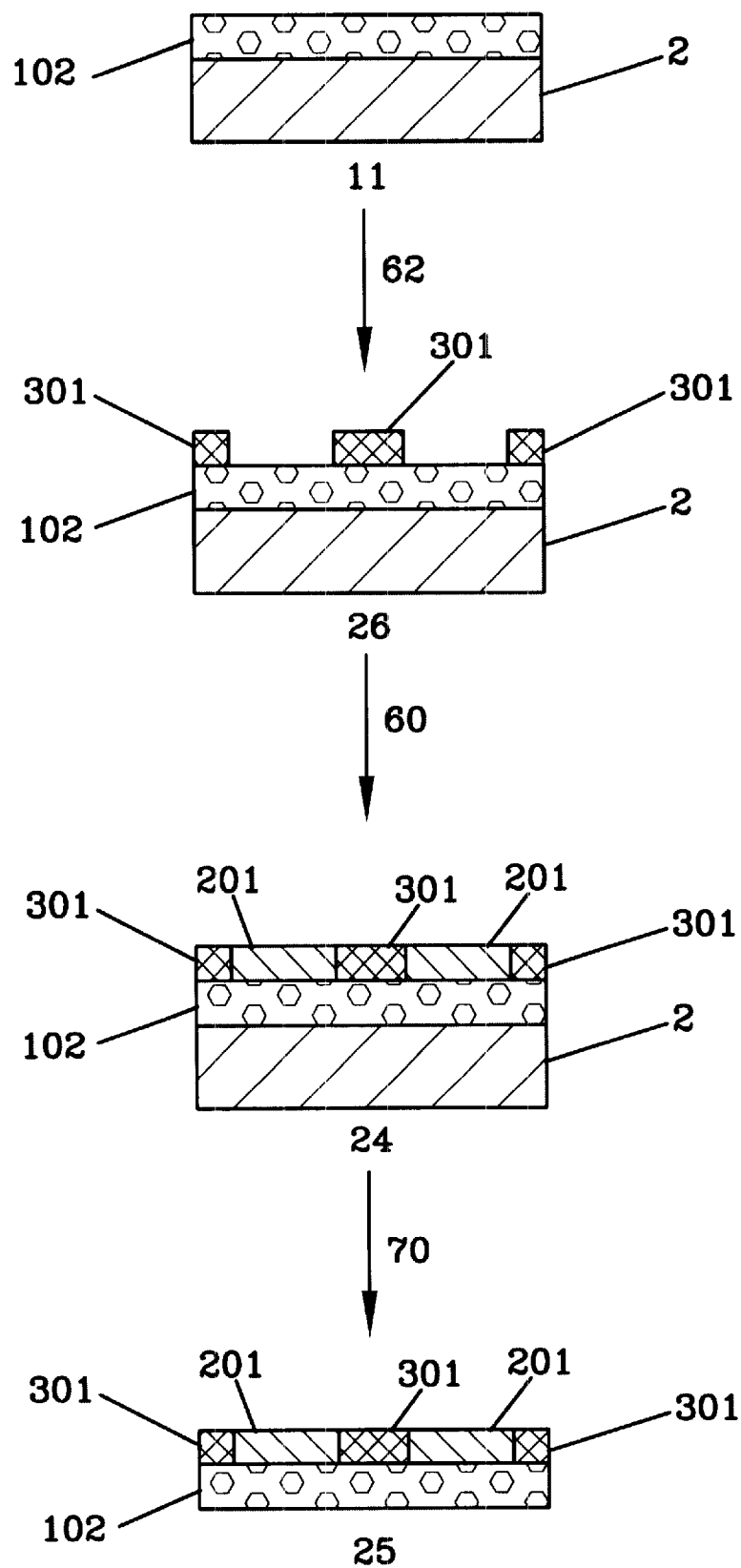
FIG. 6 shows a representative process flow diagram with cross-sectional views of one embodiment of the methods of preparing a cathode/separator assembly of this invention, which further comprises an edge insulating layer coating step 62 prior to the cathode active layer coating step 60, in comparison to the embodiment illustrated in FIG. 1.

In one embodiment, the step of coating the edge insulating layer occurs subsequent to the microporous separator layer coating step and prior to the cathode active layer coating step and the temporary carrier substrate removing step, for example, as illustrated in FIG. 6. Referring to FIG. 6, in an edge insulating layer coating step 62, an edge insulating layer 301 is coated in a desired pattern onto the outer surface of the microporous separator layer 102 of composite 11 comprising microporous separator layer 102 and temporary carrier substrate 2, which composite 11 may be prepared by the method illustrated in FIG. 1. This step 62 forms composite 26 comprising edge insulating layer 301, microporous separator layer 102, and temporary carrier substrate 2. Next, in a cathode active layer coating step 60, a cathode active layer 201 is coated in a desired pattern onto the surface of the microporous separator layer 102 to form composite 24 comprising cathode active layer 201, edge insulating layer 301, microporous separator layer 102, and temporary carrier substrate 2. Following this step 60, in a temporary carrier substrate removing step 70, the temporary carrier substrate 2 is removed from the microporous separator layer 102 of composite 24 to form cathode/separator assembly 25 comprising cathode active layer 201, edge insulating layer 301, and microporous separator layer 102.

In one embodiment, a portion of the desired pattern of the edge insulating layer is in contact with a portion of the desired pattern of the cathode active layer, for example, as illustrated in FIGS. 5 and 6. In one embodiment, the thickness of the edge insulating layer is substantially the same as the thickness of the cathode active layer, for example, as illustrated in FIGS. 5 and 6.

In one embodiment, the edge insulating layer comprises an insulating xerogel layer such as, for example, a pseudo-boehmite xerogel layer. In one embodiment, the insulating layer comprises an insulating non-porous, polymeric layer. Suitable insulating non-porous, polymeric layers include, but are not limited to, ethylene-propylene coating layers and isocyanate-crosslinked urethane coating layers.

Figure 7:
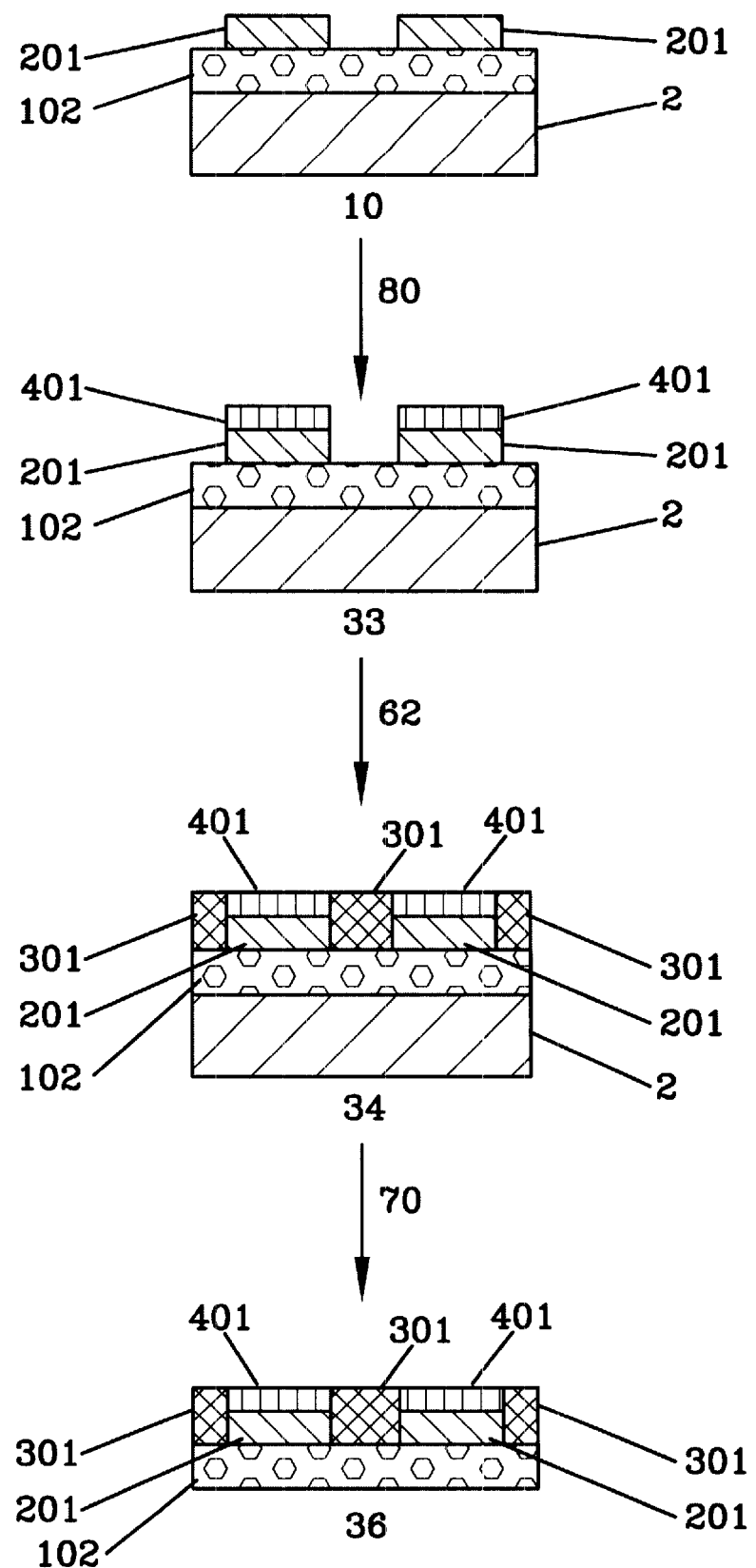
FIG. 7 shows a representative process flow diagram with cross-sectional views of one embodiment of the methods of preparing a cathode/separator assembly of the present invention, which further comprises a cathode current collector layer coating step 80 and an edge insulating layer coating step 62 prior to the temporary carrier substrate removing step 70, in comparison to the embodiment illustrated in FIG. 1.

In one embodiment of the methods of preparing a cathode/separator assembly of the present invention, the methods further comprise the step of depositing a cathode current collector layer in a desired pattern on the outer surface of the cathode active layer, for example, as illustrated in FIG. 7. In one embodiment, the step of depositing the cathode current collector layer occurs subsequent to the microporous separator and cathode active layer coating steps, prior to the step of coating the edge insulating layer, and prior to the temporary carrier substrate removing step, for example, as illustrated in FIG. 7. Referring to FIG. 7, in a cathode current collector layer coating step 80, a cathode current collector layer 401 is coated in a desired pattern onto the cathode active layer 201 of composite 12 comprising cathode active layer 201, microporous separator layer 102, and temporary carrier substrate 2, which composite 12 may be formed by the method illustrated in FIG. 1. This step 80 forms composite 33 comprising cathode current collector layer 401, cathode active layer 201, microporous separator layer 102, and temporary carrier substrate 2. Next, in an edge insulating layer coating step 62, an edge insulating layer 301 in a desired pattern is coated onto the microporous separator layer 102 to form composite 34 comprising cathode current collector layer 401, cathode active layer 201, edge insulating layer 301, microporous separator layer 102, and temporary carrier substrate 2. Following this, in a temporary carrier substrate removing step 70, the temporary carrier substrate 2 is removed from microporous separator layer 102 of composite 34 to form cathode/separator assembly 36 comprising cathode current collector layer 401, the cathode active layer 201, edge insulating layer 301, and microporous separator layer 102.

Suitable cathode current collector layers include, but are not limited to, coating layers comprising conductive metal pigments, coating layers comprising conductive carbons, coating layers comprising conductive graphites, coating layers comprising conductive polymers, and coating layers comprising conductive metal oxide pigments. Other suitable cathode current collector layers include conductive metal layers such as, for example, an aluminum layer, which may be coated or deposited by a vacuum deposition technique. In an alternative approach, the current collector layer may be laminated to the cathode surface, such as, for example, by laminating an expanded metal foil to the cathode surface.

Figures 8A, 8B:
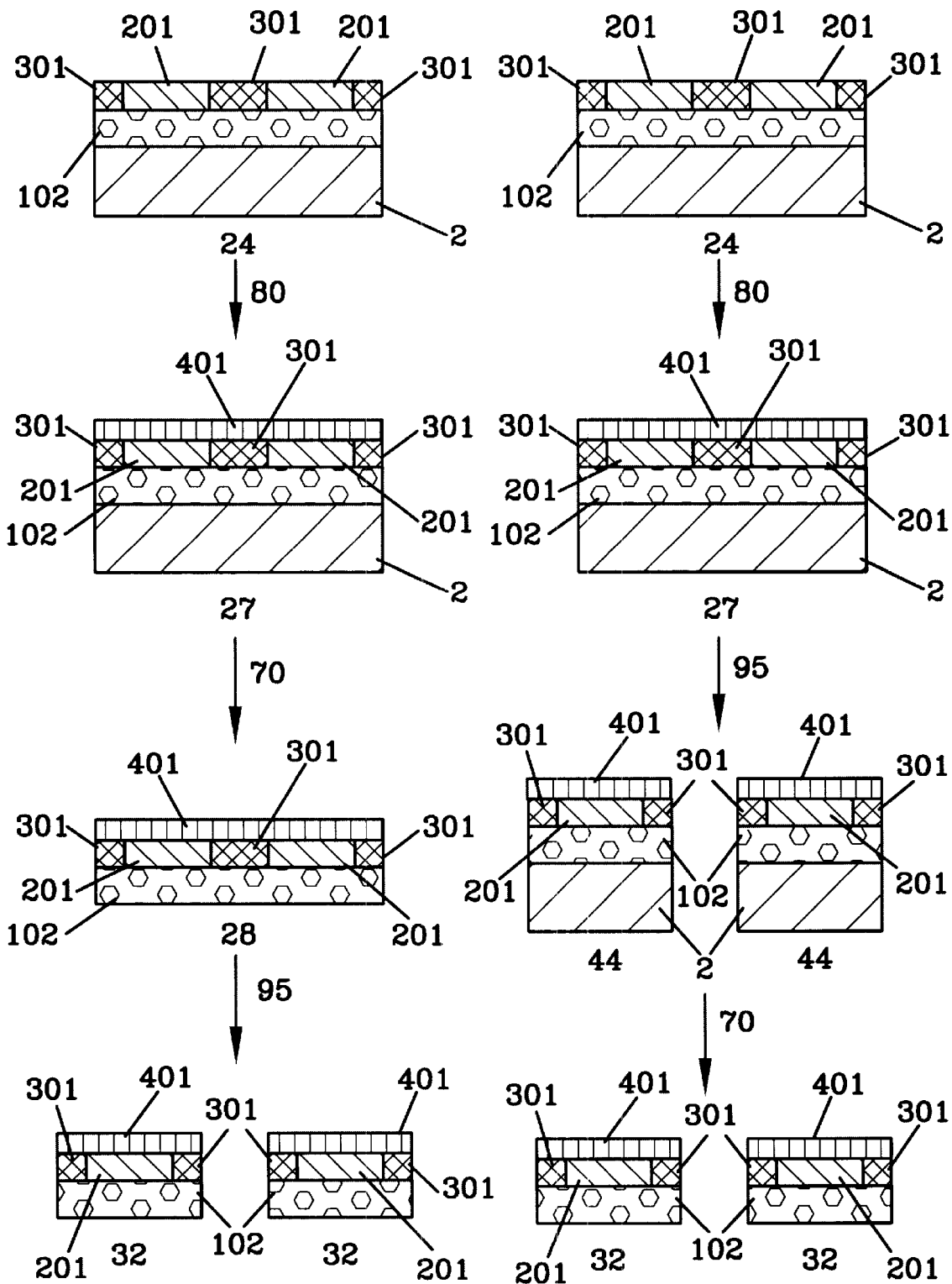
FIGS. 8A and 8B show representative process flow diagrams with cross-sectional views of two other embodiments of the methods of preparing a cathode/separator assembly of this invention, which further comprises, for FIG. 8A, a cathode current collector layer coating step 80 prior to the temporary carrier substrate removing step 70, in comparison to the embodiment illustrated in FIG. 5; and which further comprises, for FIG. 8B, a cathode current collector layer coating step 80 and a slitting step 95 prior to the temporary carrier substrate removing step 70, in comparison to the embodiment illustrated in FIG. 6.

In another embodiment of the methods of preparing a cathode/separator assembly of this invention, the methods comprise a step of depositing a cathode current collector layer in a desired pattern on the outer surface of the cathode active layer and on the outer surface of the edge insulating layer, for example, as illustrated in FIGS. 8A and 8B. In one embodiment, the step of depositing the cathode current collector layer occurs subsequent to the microporous separator and cathode active layer coating steps, subsequent to the step of coating the edge insulating layer, and prior to the temporary carrier substrate removing step, for example, as illustrated in FIGS. 8A and 8B. Referring to FIG. 8A, in a cathode current collector layer coating step 80, a cathode current collector layer 401 is coated in a desired pattern on the cathode active layer 201 and the edge insulating layer 301 of composite 24, which composite 24 may be formed by the methods illustrated in FIGS. 5 and 6. This step 80 forms composite 27 comprising cathode current collector layer 401, cathode active layer 201, edge insulating layer 301, microporous separator layer 102, and temporary carrier substrate 2. Next, in a temporary carrier substrate removing step 70, the temporary carrier substrate 2 is removed from the microporous separator layer 102 of composite 27 to form cathode/separator assembly 28 comprising cathode current collector layer 401, cathode active layer 201, edge insulating layer 301, and microporous separator layer 102. If a smaller dimension is desired for cathode/separator assembly 28, in a slitting step 95, cathode/separator assembly 28 may be cut or slit to form multiples of cathode/separator assembly 32 comprising cathode current collector layer 401, cathode active layer 201, edge insulating layer 301, and microporous separator layer 102. Referring to FIG. 8B, this is similar to FIG. 8A except that the sequence of the slitting step 95 and the temporary carrier substrate removing step 70 are reversed. In both FIG. 8A and FIG. 8B, the final product is cathode/separator assembly 32.

Figure 9A:
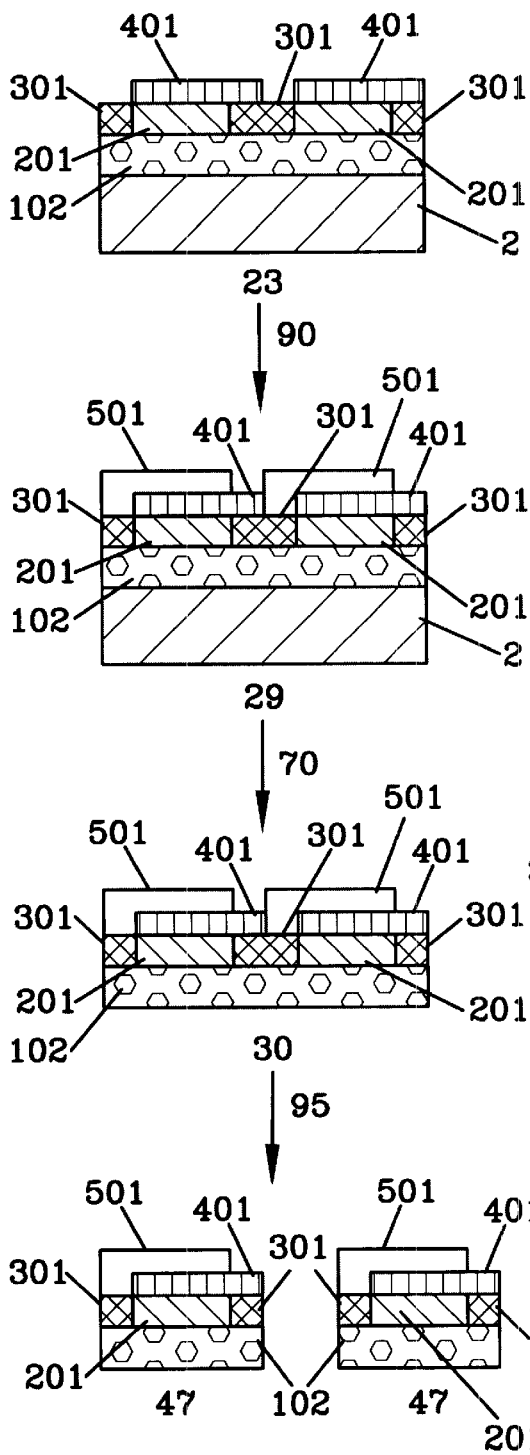
FIGS. 9A and 9B show representative process flow diagrams with cross-sectional views of two other embodiments of the methods of preparing a cathode/separator assembly of the present invention, which further comprises, for FIG. 9A, an electrode insulating layer coating step 90 prior to the temporary carrier substrate removing step 70, in comparison to the embodiment illustrated in FIG. 8A; and which further comprises, for FIG. 9B, an electrode insulating layer coating step 90 prior to the slitting step 95, in comparison to the embodiment illustrated in FIG. 8B.
Figure 9B:
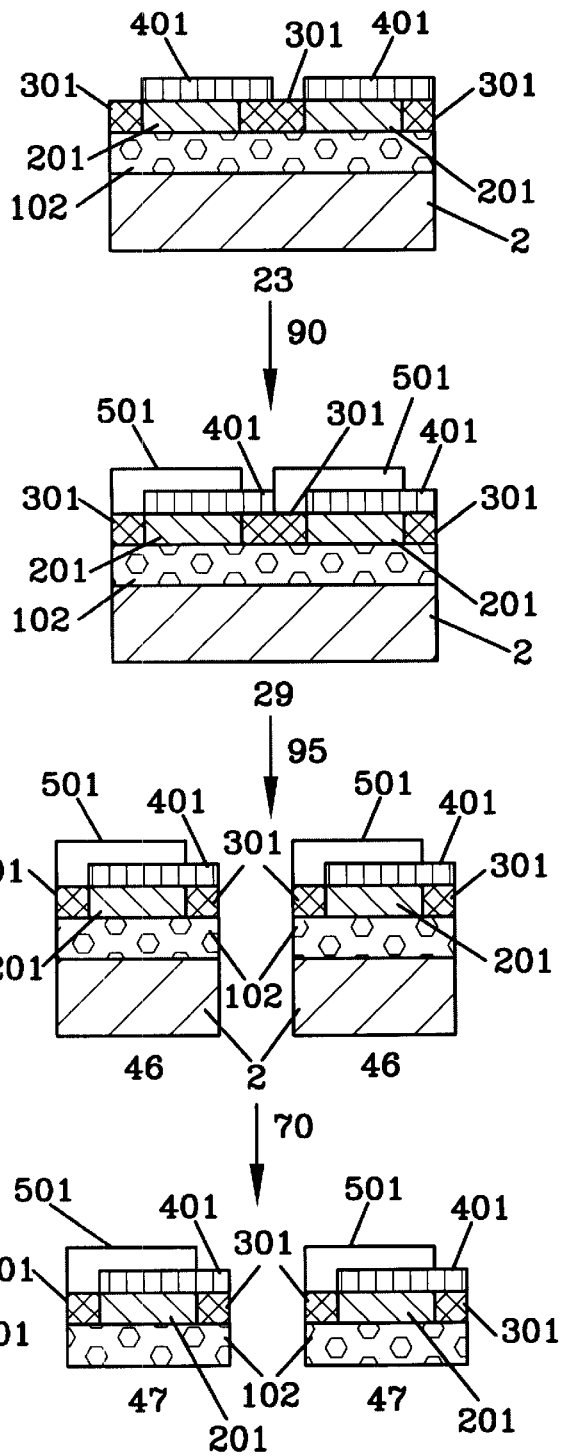

In one embodiment of the methods of preparing a cathode/separator assembly of the present invention, the methods further comprise a step of coating an electrode insulating layer in a desired pattern on the outer surface of the cathode current collector layer and on the surface of the edge insulating layer, for example, as illustrated in FIGS. 9A and 9B. Referring to FIG. 9A, in an electrode insulating layer coating step 90, an electrode insulating coating layer 501 is coated in a desired pattern onto the cathode current collector layer 401 and the edge insulating layer 301 of composite 23. This step 90 forms composite 29 comprising electrode insulating layer 501, cathode current collector layer 401, cathode active layer 201, edge insulating layer 301, microporous separator layer 102, and temporary carrier substrate 2. Next, in a temporary carrier substrate removing step 70, the temporary carrier substrate 2 is removed from the microporous separator layer 102 of composite 29 to form cathode/separator assembly 30 comprising electrode insulating layer 501, cathode current collector layer 401, cathode active layer 201, edge insulating layer 301, and microporous separator layer 102. If a smaller dimension is desired for cathode/separator assembly 30, in a slitting step 95, cathode/separator assembly 30 may be slit or cut to form multiples of cathode/separator assembly 47 comprising electrode insulating layer 501, cathode current collector layer 401, cathode active layer 201, edge insulating layer 301, and microporous separator layer 102. FIG. 9B is similar to FIG. 9A except that the sequence of the slitting step 95 and the temporary carrier substrate removing step 70 are reversed. In both FIG. 9A and FIG. 9B, the final product is cathode/separator assembly 47.

The various coating layers in the methods of preparing a cathode/separator assembly of the present invention may be coated from a liquid mixture comprising a liquid carrier medium and the solid materials of the layer which are dissolved or dispersed in the liquid carrier medium. The choice of the liquid carrier medium may vary widely and includes water, organic solvents, and blends of water and organic solvents. Exemplary organic solvents include, but are not limited to, alcohols, ketones, esters, and hydrocarbons. The choice of the liquid carrier medium depends mainly on the compatibility with the particular solid materials utilized in the specific coating layer, on the type of method of coating application to the receiving surface, and on the requirements for wettability and other coating application properties of the particular receiving surface for the coating. For example, for coating a microporous xerogel layer, the liquid carrier medium is typically water or a blend of water with an alcohol solvent, such as isopropyl alcohol or ethyl alcohol, since the sol-gel materials that dry and condense to form the xerogel layer typically are most compatible with a water-based, highly polar liquid carrier medium.

The application of the liquid coating mixture to the temporary carrier substrate or other layer may be done by any suitable process, such as the conventional coating methods, for example, of wire-wound rod coating, spray coating, spin coating, reverse roll coating, gravure coating, slot extrusion coating, gap blade coating, and dip coating. The liquid coating mixture may have any desired solids content that is consistent with the viscosity and rheology that is acceptable in the coating application method. After the liquid coating mixture is applied on the temporary carrier substrate or other layer, the liquid carrier medium is typically removed to provide a dried, solid coating layer. This removal of the liquid carrier medium may be accomplished by any suitable process, such as conventional methods of drying, for example, hot air at a high velocity or exposure to ambient air conditions. Some layers of the separator/cathode assembly of the present invention such as, for example, current collector layers or cathode membrane layers, may be formed by techniques such as vacuum deposition, ion-sputtering, vacuum flash evaporation, and other methods as known in the art.

Cathode/Separator Assemblies

Another aspect of the present invention pertains to cathode/separator assemblies prepared according to the methods of the present invention, as described herein. Thus, the cathode/separator assemblies of the present invention comprise a cathode active layer and a microporous separator layer, which cathode/separator assemblies are prepared according to the methods of this invention.

Methods of Preparing Electrochemical Cells

Another aspect of the present invention pertains to methods of preparing an electrochemical cell, which methods comprise the steps of: (a) providing a cathode/separator assembly prepared by a method comprising the steps of (i) coating a microporous separator layer on a temporary carrier substrate, wherein the separator layer has a first surface in contact with the temporary carrier substrate and has a second surface on the side opposite from the temporary carrier substrate, (ii) coating a cathode active layer in a desired pattern on the second surface of the separator layer, wherein the cathode active layer has a first surface in contact with the second surface of the separator layer and has a second surface on the side opposite from the separator layer, and (iii) removing the temporary carrier substrate from the first surface of the separator layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in pores of the separator layer; and wherein the first surface of the separator layer of the cathode/separator assembly and the anode are positioned in a face-to-face relationship and the second surface of the cathode active layer and the cathode current collector layer are positioned in a face-to-face relationship. In one embodiment, the microporous separator layer comprises one or more microporous xerogel layers. In one embodiment, the cathode/separator assembly further comprises one or more protective coating layers comprising a polymer, wherein the one or more protective coating layers are in contact with at least one of the one or more microporous layers of the separator layer. In one embodiment, step (ii) comprises a lamination step of applying an assembly comprising the cathode active layer to the surface of the separator layer on the side opposite from the temporary carrier substrate, wherein the cathode active layer has a first surface in contact with the separator layer and has a second surface on the side opposite from the temporary carrier substrate. In one embodiment of the lamination process in step (ii), the assembly comprising the cathode active layer further comprises a second temporary carrier substrate, and wherein, subsequent to step (ii), there is a step of removing the secondary temporary carrier substrate from the assembly comprising the cathode active layer.

In one embodiment of the methods of preparing an electrochemical cell of this invention, the cell is a secondary cell. In one embodiment of the methods of preparing an electrochemical cell of this invention, the cell is a primary cell.

In a preferred embodiment of the methods of preparing an electrochemical cell of this invention, the microporous separator layer comprises one or more microporous pseudo-boehmite xerogel layers. In a more preferred embodiment, the cathode/separator assembly further comprises one or more protective coating layers comprising a polymer, wherein the one or more protective coating layers are in contact with at least one of the one or more microporous pseudo-boehmite layers.

Suitable electroactive materials in the cathode active layer for the methods of preparing an electrochemical cell of the present invention include, but are not limited to, electroactive transition metal chalcogenides, electroactive conductive polymers, and electroactive sulfur-containing materials, as described herein.

A wide variety of anode active materials may be utilized in the anodes for the methods of preparing an electrochemical cell of the present invention. Suitable anode active materials for the anodes include, but are not limited to, hydrogen-storing alloys for use with nickel-containing cathodes, and one or more metals or metal alloys or a mixture of one or more metals and one or more alloys, wherein the metals are selected from the Group IA and IIA metals in the Periodic Table. Examples of suitable anode active materials include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are especially useful. Preferred anode active materials in the methods of preparing an electrochemical cell of this invention are lithium metal, lithium-aluminum alloys, lithium-tin alloys, lithium-intercalated carbons, and lithium-intercalated graphites.

The electrolyte used in the cells of the present invention functions as a medium for storage and transport of ions, and may be any of the types of electrolytes known in the art of electrochemical cells. Any liquid, solid, or solid-like gel material capable of storing and transporting ions may be used, so long as the material is sufficiently chemically and electrochemically stable with respect to the anode and the cathode and the material facilitates the transportation of ions between the anode and the cathode without providing electrical conductivity that might cause a short circuit between the anode and the cathode. Electrolytes may be aqueous, non-aqueous, organic or inorganic. Typically the electrolyte comprises one or more ionic electrolyte salts to provide ionic conductivity and one or more liquid electrolyte solvents, gel polymer materials, or solid polymer materials.

Examples of suitable electrolytes for use in the methods of preparing an electrochemical cell of the present invention include, but are not limited to, electrolytes comprising one or more electrolytes selected from the group consisting of liquid electrolytes, gel polymer electrolytes, and solid polymer electrolytes. In a preferred embodiment, the electrolyte comprises a liquid electrolyte.

Examples of suitable liquid electrolyte solvents include, but are not limited to, those selected from the group consisting of water, N-methyl acetamide, acetonitrile, carbonates, sulfones, sulfolanes, aliphatic ethers, cyclic ethers, glymes, siloxanes, dioxolanes, N-alkyl pyrrolidones, substituted forms of the foregoing, and blends thereof. Fluorinated derivatives of the foregoing are also useful as liquid electrolyte solvents.

These liquid electrolyte solvents are themselves useful as plasticizers in semi-solid or gel polymer electrolytes. Suitable gel polymer electrolytes include, but are not limited to, those comprising, in addition to one or more electrolyte solvents sufficient to provide the desired semi-solid or gel state, one or more polymers. Examples of suitable polymers include, but are not limited to, those selected from the group consisting of polyethylene oxides (PEO), polypropylene oxides, polyacrylonitriles, polysiloxanes, polyphosphazenes, polyimides, polyethers, sulfonated polyimides, perfluorinated membranes (such as, for example, NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Solid polymer electrolytes useful in the present invention include, but are not limited to, those comprising one or more polymers selected from the group consisting of polyethers, polyethylene oxides (PEO), polypropylene oxides, polyimides, polyphosphazenes, polyacrylonitriles, polysiloxanes, polyether grafted polysiloxanes, derivatives of the foregoing, copolymers of the foregoing, crosslinked and network structures of the foregoing, and blends of the foregoing. The solid polymer electrolytes of this invention may optionally further comprise one or more electrolyte solvents, typically at a level of less than 20 per cent by weight of the solid polymer electrolyte.

To improve the ionic conductivity and other electrochemical properties, the electrolyte typically comprises one or more ionic electrolyte salts. Examples of ionic electrolyte salts suitable for use in the present invention include, but are not limited to, $MBr$, $MI$, $MClO_4$, $MAsF_6$, $MSCN$, $MSO_3CF_3$, $MSO_3CH_3$, $MBF_4$, $MB(Ph)_4$, $MPF_6$, $MC(SO_2CF_3)_3$,

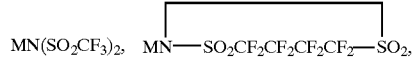

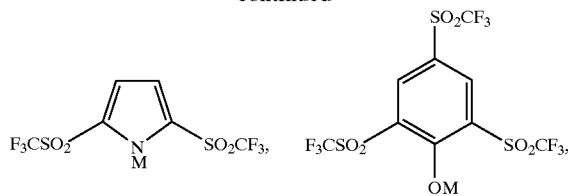

and the like, where M is Li or Na. Other electrolyte salts useful in the practice of this invention are alkali metal hydroxides, lithium polysulfides, lithium salts of organic ionic polysulfides, and those disclosed in U.S. Pat. No. 5,538,812 to Lee et al. Preferred ionic electrolyte salts are LiI, LiSCN, $LiSO_3CF_3$ (lithium triflate), and $LiN(SO_2CF_3)_2$ (lithium imide).

In one embodiment of the methods of preparing an electrochemical cell of the present invention, the electrode insulating layer comprises a polymeric plastic film, such as, for example, a polyethylene terephthalate film, a polyethylene naphthalate film, and a polyimide film. In one embodiment, the electrode insulating layer comprises a polymeric coating, such as, for example, an ethylene-propylene polymer coating.

Since the one or more microporous xerogel layers of the separator layer of the methods of this invention are usually impermeable to high molecular weight materials such as the polymers typically used in gel polymer electrolytes and solid polymer electrolytes, it is preferable to introduce the polymer component of the electrolyte in a low molecular weight monomer or macromonomer form into pores of the xerogel layer, such as in a coating step prior to the cathode active layer coating step or in a coating step after the step of removing the temporary carrier substrate from the separator layer. Subsequently, the low molecular weight monomer or macromonomer may be cured into a polymer to provide the desired type of solid polymer or gel polymer electrolyte. Suitable monomers or macromonomers include, but are not limited to, heat- or radiation-curable monomers or macromonomers. Examples include, but are not limited to, divinyl ethers such as tetraethylene glycol divinyl ether. To provide sensitivity to ultraviolet (UV) or visible radiation when the monomers or macromonomers do not absorb significantly, a conventional photosensitizer may be added to accelerate curing of the monomers or macromonomers into a polymeric material. For example, a small amount of a UV sensitizer, such as 0.2% by weight of the monomers or macromonomers, may be added. The typically transparent or nearly transparent nature of the microporous layers of the separator layer of the methods of this invention is beneficial in allowing the sensitizing ultraviolet or visible radiation to efficiently penetrate throughout the separator layer. Also, the positioning of the separator layer may be on the outside of the cell stack when the electrolyte is present in pores of the separator, for example, as illustrated for cell stack 38 in FIG. 10 and for cell stack 54 in FIG. 11. This is particularly convenient for carrying out radiation curing of the electrolyte with ultraviolet or visible radiation.

Another aspect of the present invention pertains to methods of preparing an electrochemical cell, which methods comprise the steps of: (a) providing a cathode/separator assembly prepared by a method comprising the steps of (i) coating a microporous separator layer on a temporary carrier substrate, wherein the separator layer has a first surface in contact with the temporary carrier substrate and has a second surface on the side opposite from the temporary carrier substrate, (ii) coating a cathode active layer in a desired pattern on the second surface of the separator layer, wherein the cathode active layer has a first surface in contact with the second surface of the separator layer and has a second surface on the side opposite from the separator layer, (iii) coating an edge insulating layer in a desired pattern on the second surface of the separator layer, wherein the edge insulating layer has a first surface in contact with the second surface of the separator layer and has a second surface on the side opposite from the separator layer, and (iv) removing the temporary carrier substrate from the first surface of the separator layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in pores of the separator layer; wherein the first surface of the separator layer of the cathode/separator assembly and the anode are positioned in a face-to-face relationship and the second surface of the cathode active layer and the cathode current collector layer are positioned in a face-to-face relationship.

Figure 10:
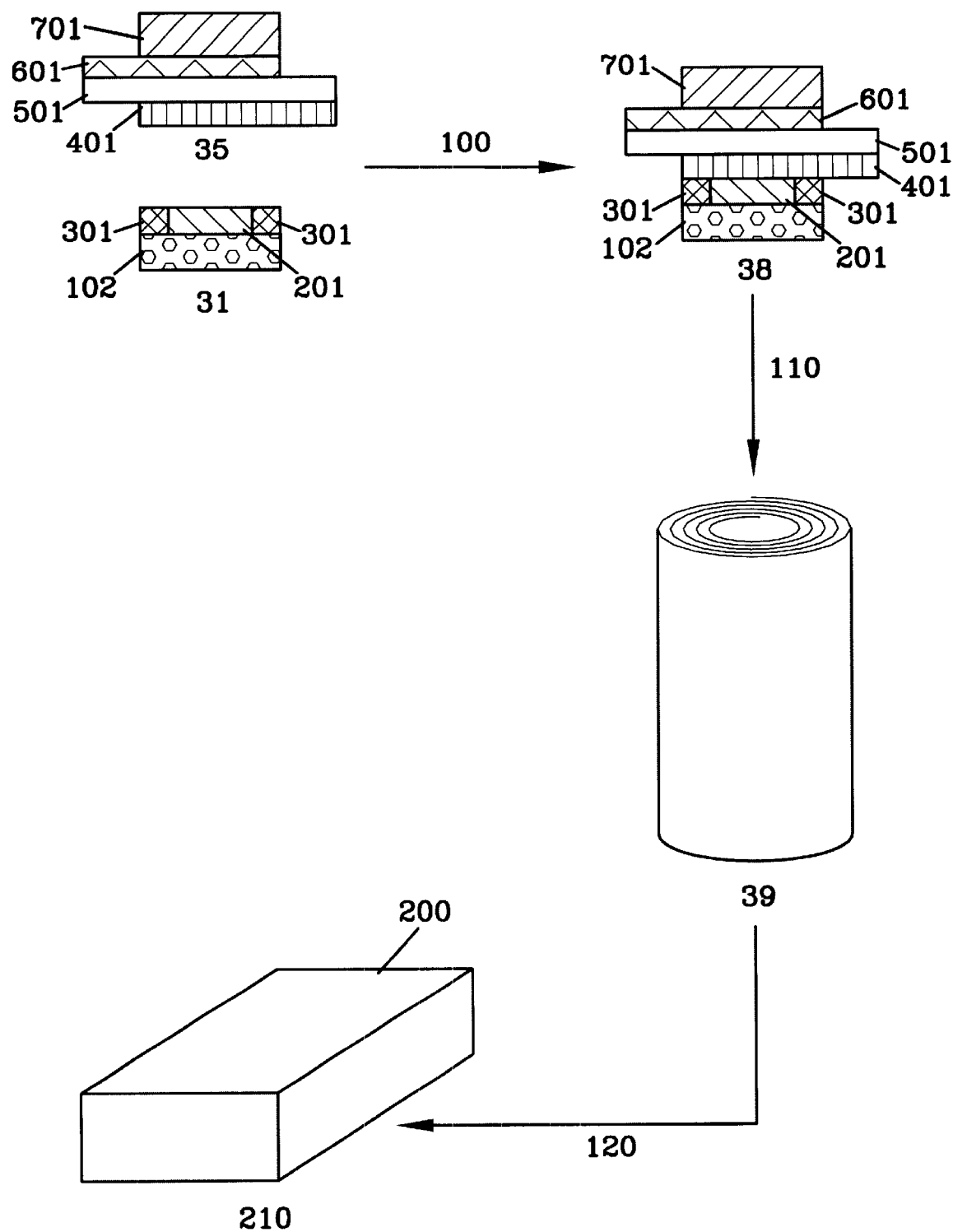
FIG. 10 shows a representative process flow diagram with cross-sectional views of one embodiment of the methods of preparing an electrochemical cell of this invention, which comprises a combining step 100 utilizing a cathode/separator assembly 31 as one element, a winding step 110, and an electrolyte filling and sealing step 120.

Another aspect of this invention pertains to methods of preparing an electrochemical cell comprising a casing and a multilayer cell stack, which methods comprise the steps of: (a) providing a laminar combination of (i) an anode assembly comprising an anode comprising an anode active layer, wherein the anode active layer comprises an anode active material comprising lithium; a first cathode current collector layer; and an electrode insulating layer interposed between the anode and the first cathode current collector layer, and (ii) a cathode/separator assembly comprising a cathode active layer in a first desired coating pattern on a first surface of a microporous separator layer and with an edge insulating layer in a second desired coating pattern on the first surface of the separator layer, wherein the cathode active layer has a first surface in contact in the first desired coating pattern with the first surface of the separator layer and has a second surface on the side opposite from the separator layer, and the edge insulating layer has a first surface in contact in the second desired coating pattern with the first surface of the separator layer and has a second surface on the side opposite to the separator layer; wherein the first cathode current collector layer and the second surface of the cathode active layer are positioned in a face-to-face relationship; (b) winding the laminar combination to form an anode-electrode insulating layer-first cathode current collector layer-cathode/separator assembly multilayer cell stack, wherein the first cathode current collector layer is in contact with the second surface of the cathode active layer; (c) providing an electrolyte, wherein the electrolyte is contained in pores of the separator layer of the multilayer cell stack; (d) providing a casing to enclose the multilayer cell stack; and (e) sealing the casing. FIG. 10 illustrates one embodiment of this aspect of the methods of the present invention.

The term "multilayer cell stack," as used herein, pertains to a cell stack, which cell stack within an electrochemical cell, when viewed in a cross-section of at least one profile plane, has more than one electric current producing layer, i.e., more than one combined anode-electrolyte element-cathode construction. A single layer cell stack has only one anode-electrolyte element-cathode construction when viewed in a cross-section of at least one profile plane. The term "casing," as used herein, pertains to the outermost surface of an electrochemical cell, where the outermost surface is adjacent to the multiple electrochemical anode-electrolyte element-cathode layers or multilayer cell stack and acts as a seal or barrier against the transport of liquids or volatile materials into or out of the cell stack.

A wide variety of barrier materials may be utilized for the casing in the methods of preparing multilayer electrochemical cells of this invention. Suitable barrier materials include, but are not limited to, metal films, plastic-metal composite films, plastic films, and rigid metal sheeting and cans. The basic requirement of the barrier materials is that they can be sealed by a suitable process, such as heating, ultrasonic welding, or laser welding, to form a sealed casing for the electrochemical cell, in which the barrier material in the sealed casing provides a barrier against the leakage of fluids through the casing. For example, the barrier material may be provided as two sheets of matched size which are positioned on either side of the cell stack and subsequently sealed on all four edges to form the casing of a prismatic cell.

Referring to FIG. 10, in a combining step 100, a cathode/separator assembly 31 comprising cathode active layer 201, edge insulating layer 301, and microporous separator layer 102, which cathode/separator assembly 31 may be formed by the method illustrated in FIG. 5, is combined with an anode assembly 35 comprising an anode active layer 701, anode current collector layer 601, electrode insulating layer 501, and cathode current collector layer 401 to form an anode-electrode insulating layer-cathode/separator assembly combination 38. Next, in a winding step 110, combination 38 is wound, stacked, or otherwise combined to form an anode-electrode insulating layer-cathode/separator assembly multilayer cell stack 39. Following this step 110, in an electrolyte filling and sealing step 120, multilayer cell stack 39 is provided with electrolyte in pores of the separator and is further provided with a casing 200 which is sealed around the cell stack to form electrochemical cell 210. The cell stack and the casing may be of a variety of shapes and sizes including, but not limited to, cylindrical and prismatic.

The term "prismatic," as used herein, pertains to a solid shape where at least two surfaces are substantially flat and parallel to each other. The dimensions of the cell stacks produced in the methods of the present invention depend on the widths and lengths of the anode and cathode/separator assemblies as wound, stacked, or otherwise combined into a multilayer cell stack and, optionally, on any slitting or cutting of these assemblies that occurs after the winding step. Typically, the anode assembly and the cathode/separator assembly are of similar, but distinct, widths and lengths and may be slightly offset from each other on the edges to allow for more efficient electrical connections by tabs and other electrical contacts and for more effective insulation against internal short circuits, as known in the art of battery fabrication as, for example, described in U.S. Pat. No. 5,439,760 to Howard et al. and U.S. Pat. No. 5,549,717 to Takeuchi et al. Also, the anode assembly and the cathode/separator assembly may be of identical widths or, alternatively, may be wound, stacked, or otherwise combined in dimensions greater than the desired dimensions in the cell stack and subsequently may be cut down to the desired dimensions.

Tabs are well known in the art of fabricating electrochemical cells, including cylindrical and prismatic cells, for providing the connections between the anode and the cathode to the external circuit for the cell. For example, in the methods of preparing electrochemical cells of the present invention, one or more tabs may be connected to the anode and then attached or fed through the casing of the cell for connection to the external circuit. For anodes comprising lithium metal, for example lithium foil, the connection of the tab to the anode may be directly to the lithium metal or, alternatively, may be to an anode current collector layer, if one is present in the anode. Suitable materials for use in the anode tabs include, but are not limited to, nickel and copper, such as, for example, 0.125 inch thick nickel tabs. These metal tabs to the anode may be attached to the lithium metal of the anode or to the anode current collector layer, if one is present, by a variety of conventional methods, such as, for example, by applying pressure or by ultrasonic welding.

For the cathodes of the methods of preparing electrochemical cells of the present invention, the connection of one or more tabs is typically made to the cathode current collector layer. Suitable materials for use in the cathode tabs include, but are not limited to, aluminum, nickel, silver, tin, and stainless steel. These metal tabs to the cathode may be attached to the cathode current collector layer by a variety of conventional methods, similar to those that may be utilized for anode tabs.

The insertion and attachment of the tabs to the anode and to the cathode may occur at various steps in the methods of preparing electrochemical cells of the present invention as long as it occurs before the completion of the filling step with the electrolyte. For example, the tabbing steps on the anode and the cathode may be done prior to the winding step; or may be done subsequent to the winding step, but before the filling and sealing step.

The leads of the tabs protrude from the cell stack and, particularly in the case of prismatic cells, may extend from the casing after sealing so that the leads may be connected to the external circuit. These leads may be part of the original tabs that were attached to the electrodes or may be conductive extensions that have been attached or added to the original tabs. To prevent any short circuits between the anode and the cathode, the one or more anode tabs and the one or more cathode tabs are maintained in an electrically insulated relationship to each other.

As the layers in a multilayer cell stack of an electrochemical cell become thinner and the total surface areas of the anode and cathode become larger, it becomes progressively more difficult to achieve efficient collection of the current from the cell using a single tab, or a small number of tabs, from the anode and from the cathode to the external circuit. Also, current collection through only a few tabs or a single tab to a lithium metal foil anode in a large surface area cell, such as, for example, 1000 cm$^2$ of lithium metal foil anode in a prismatic cell with external dimensions of 34 mm wide, 70 mm long, and 7 mm thick, may have a shortened cycle life due to severing or loss of lithium metal at the tab connections. This would prevent current collection from any portion of the cell no longer connected electrically to the severed tab connection. Accordingly, it is advantageous to do a continuous edge contacting of the edges of the anode and the cathode in addition to at least one tab to the anode and to the cathode to collect the current from the continuous edge contacting for connection to the external circuit. U.S. Pat. No. 5,415,954 to Gauthier et al. describes continuous edge contacting of the lithium metal of an anode in combination with the use of a polymer electrolyte.

When the anode of the methods of preparing electrochemical cells of the present invention is lithium metal which also acts as the anode current collector layer, the edge of the lithium metal anode may be placed in electrical contact by a variety of methods including, but not limited to, ultrasonic welding and metal spraying. In one embodiment, the edge of the lithium metal anode extends beyond the corresponding edges of the cathode active layer and the microporous separator layer, and substantially all of the lithium metal extensions are placed in electrical contact by ultrasonic welding.

When the anode of the methods of preparing electrochemical cells of this invention comprises an anode active layer comprising lithium and an anode current collector layer, as described herein, the edge of the conductive layer of the anode current collector layer may be placed in electrical contact by a variety of methods including, but not limited to, metal spraying. In one embodiment, the edge of the anode current collector layer provides a plurality of anode contact edges for the multilayer cell stack; and a metallic layer is deposited in electrical contact with the anode current collector layers at substantially all of the anode contact edges. Suitable metals for the metallic layer include, but are not limited to, copper, and nickel. Preferably, the metallic layer is deposited by metal spraying. In one embodiment, the conductive material of the anode current collector layer comprises copper, and the electrode insulating layer of the cell is selected from the group consisting of polymeric plastic films and polymeric coatings.

When the cathode of the methods of preparing electrochemical cells of the present invention comprises a conductive metal layer as the cathode current collector layer, the edge of the cathode current collector layer may be placed in electrical contact by a variety of methods including, but not limited to, ultrasonic welding and metal spraying. In one embodiment, the edge of the cathode current collector layer provides a plurality of cathode contact edges for the multilayer cell stack; and a metallic layer is deposited in electrical contact with the cathode current collector layers at substantially all of the cathode contact edges; and, preferably, the edge of the cathode current collector layer extends beyond the corresponding edges of the cathode active layer, the microporous separator layer, and the anode. Suitable metals for the metallic layer include, but are not limited to, aluminum, nickel, silver, tin, and stainless steel. Preferably, the metallic layer is deposited by metal spraying.

The electrolyte may be introduced into the cathode/separator assembly in part or completely at various steps in the methods of preparing an electrochemical cell of this invention. Typically, the electrolyte is introduced into the cathode/separator assembly after the casing is formed around the cathode/separator/anode assembly through an opening in the casing. This filling step is followed by the complete sealing of the casing by closing the fill opening. Alternatively, the electrolyte may be introduced before the casing is formed around the cathode/separator/anode assembly, as, for example, described in U.S. patent application Ser. No. 09/215,030 now U.S. Pat. No. 6,190,426 Thibault et al. of the common assignee, the disclosure of which is fully incorporated herein by reference. Also, part or all of the electrolyte may be impregnated into pores of the cathode/separator assembly 31 before the winding step 110, as, for example, described in U.S. patent application Ser. No. 08/995,089 to Carlson et al. of the common assignee.

Figure 11:
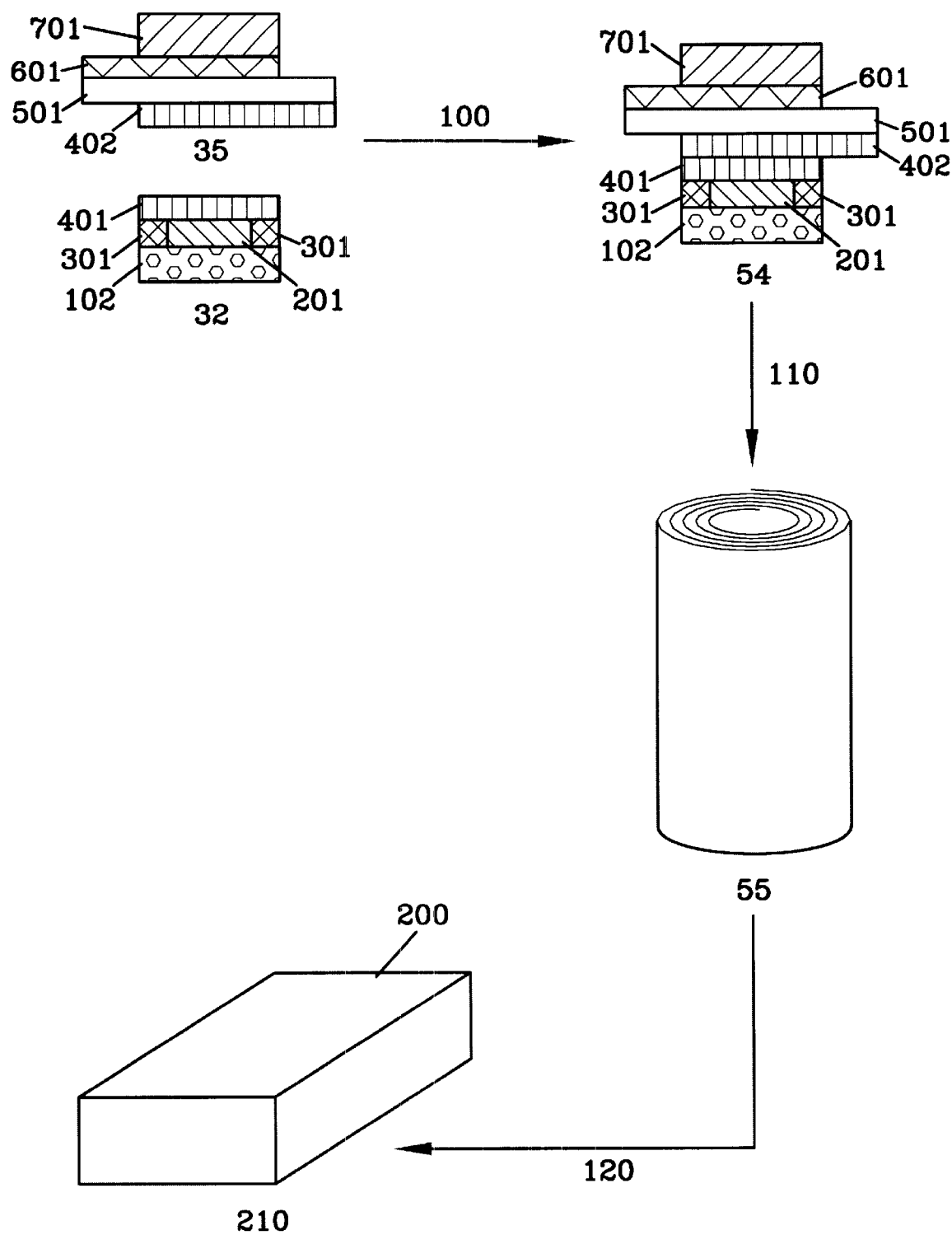
FIG. 11 shows a representative process flow diagram with cross-sectional views of one embodiment of the methods of preparing an electrochemical cell of this invention, which comprises a combining step 100 utilizing a cathode/separator assembly 32 as one element, a winding step 110, and an electrolyte filling and sealing step 120.

In one embodiment of the methods of preparing an electrochemical cell of the present invention, a cathode current collector layer is deposited in a desired pattern on the second surface of the cathode active layer and on the second surface of the edge insulating layer, for example, as illustrated in FIG. 11. Referring to FIG. 11, in a combining step 100, a cathode/separator assembly 32 comprising cathode current collector layer 401, cathode active layer 201, edge insulating layer 301, and microporous separator layer 102, which cathode/separator assembly 32 may be formed by the methods illustrated in FIGS. 8A and 8B, is combined with an anode assembly 35 comprising anode active layer 701, anode current collector layer 601, electrode insulating layer 501, and cathode current collector layer 402 to form an anode-electrode insulating layer-cathode/separator assembly combination 54. Next, in a winding step 110, combination 54 is wound, stacked, or otherwise combined to form an anode-electrode insulating layer-cathode/separator assembly multilayer cell stack 55. Following this step 110, in an electrolyte filling and sealing step 120, multilayer cell stack 55 is provided with electrolyte in pores of the separator and is further provided with a casing 200 which is sealed around the cell stack to form electrochemical cell 210. The wide variety of sizes and shapes possible for the cell stack and the casing and the variety of options for introducing the electrolyte at different steps in the process are as described hereinabove for the embodiment illustrated in FIG. 10. In one embodiment, as illustrated, for example, in FIG. 11, the anode further comprises an anode current collector layer interposed between the anode active layer and the electrode insulating layer.

In one embodiment of the methods of preparing an electrochemical cell of this invention, the cathode/separator assembly of step (a) further comprises a temporary carrier substrate on a second surface of the separator layer, which second surface is on the side opposite from the cathode active layer and from the edge insulating layer, and the methods further comprise a step of removing the temporary carrier substrate from the second surface of the separator layer prior to completion of step (b). In one embodiment, a cathode current collector layer in a desired coating pattern is deposited on the second surface of the cathode active layer and on the second surface of the edge insulating layer.

In one embodiment of the methods of preparing an electrochemical cell of the present invention, the anode of the anode assembly and the second surface of the separator layer of the cathode/separator assembly are positioned in a face-to-face relationship in step (a), and a first cathode current collector layer-electrode insulating layer-anode-cathode/separator assembly multilayer cell stack is formed in step (b), wherein the anode is in contact with the second surface of the separator layer. In one embodiment, a cathode current collector layer is deposited in a desired coating pattern on the second surface of the cathode active layer and on the second surface of the edge insulating layer.

Figure 12:
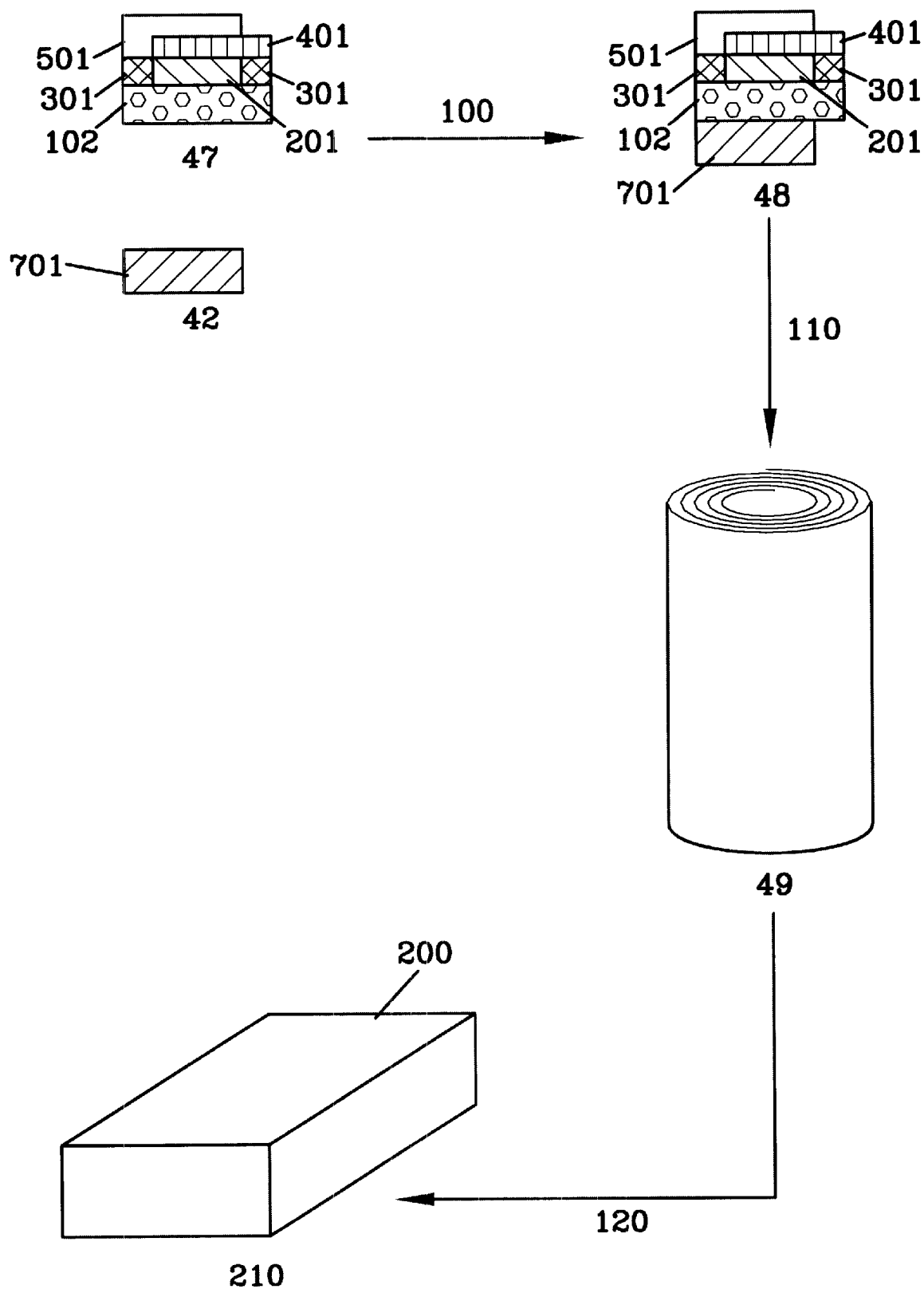
FIG. 12 shows a representative process flow diagram with cross-sectional views of one embodiment of the methods of preparing an electrochemical cell of the present invention, which comprises a combining step 100 utilizing an anode active layer 701 as one element and a cathode/separator assembly 47 as a second element, a winding step 110, and an electrolyte filling and sealing step 120.

Another aspect of this invention pertains to methods of preparing an electrochemical cell comprising a casing and a multilayer cell stack, which methods comprise the steps of: (a) providing a laminar combination of (i) an anode assembly comprising an anode comprising lithium metal; and, (ii) a cathode/separator assembly comprising a cathode active layer in a first desired coating pattern on a first surface of a microporous separator layer and with an edge insulating layer in a second desired coating pattern on the first surface of the separator layer, wherein the cathode active layer has a first surface in contact in the first desired coating pattern with the first surface of the separator layer and has a second surface on the side opposite from the separator layer, and the edge insulating layer has a first surface in contact in the second desired coating pattern with the first surface of the separator layer and has a second surface on the side opposite to the separator layer; a cathode current collector layer in a third desired coating pattern on the second surface of the cathode active layer and on the second surface of the edge insulating layer, wherein the cathode current collector layer has a first surface in contact with the second surface of the cathode active layer and has a second surface on the side opposite from the cathode active layer; an electrode insulating layer in a fourth desired coating pattern on the second surface of the cathode current collector layer and on the second surface of the edge insulating layer, wherein the electrode insulating layer has a first surface in contact with the second surface of the cathode current collector layer and has a second surface on the side opposite from the cathode current collector layer; wherein the node and the second surface of the electrode insulating layer are positioned in a face-to-face relationship; (b) winding the laminar combination to form an anode-electrode insulating layer-cathode current collector layer-cathode/separator assembly multilayer cell stack, wherein the anode is in contact with a second surface of separator layer on the side opposite from the cathode active layer; (c) providing an organic electrolyte, wherein the organic electrolyte is contained in pores of the separator layer of the multilayer cell stack; (d) providing a casing to enclose the multilayer cell stack; and (e) sealing the casing. FIG. 12 illustrates one embodiment of this aspect of the methods of the present invention.

Referring to FIG. 12, in a combining step 100, cathode/separator assembly 47 comprising an electrode insulating layer 501, cathode current collector layer 401, cathode active layer 201, edge insulating layer 301, and microporous separator layer 102, which assembly 47 may be formed by the methods illustrated in FIGS. 9A and 9B, is combined with an anode assembly 42 comprising an anode active layer 701 comprising lithium metal to form an cathode/separator assembly-anode assembly combination 48. Next, in a winding step 110, combination 48 is wound, stacked, or otherwise combined to form an electrode insulating layer-cathode/separator assembly-anode assembly multilayer cell stack 49 having alternating assemblies of cathode/separator assembly 47 and anode assembly 42. Following this step 110, in an electrolyte filling and sealing step 120, multilayer cell stack 49 is provided with electrolyte in pores of the separator layer and is further provided with a casing 200 which is sealed around the cell stack to form the electrochemical cell 210. The wide variety of sizes and shapes possible for the cell stack and the casing and the variety of options for introducing the electrolyte at different steps in the process are as described herein-above for the embodiment illustrated in FIG. 10.

In one embodiment, the cathode/separator assembly of step (a) further comprises a temporary carrier substrate on a second surface of the separator layer, which second surface is on the side opposite from the cathode active layer and from the edge insulating layer, and the methods further comprise the step of removing the temporary carrier substrate from the separator layer prior to completion of step (b). In one embodiment, the anode and the second surface of the separator layer of the cathode/separator assembly are positioned in a face-to-face relationship in step (a), and an anode-cathode/separator assembly-cathode current collector layer-electrode insulating layer multilayer cell stack is formed in step (b).

A particular benefit of the methods of preparing electrochemical cells of the present invention is that only two layers, an anode assembly and a cathode/separator assembly, need to be combined in a laminar manner and then wound to form a multilayer cell stack instead of the more complex three layers of an anode assembly, a free-standing separator, and a cathode, in a typical cell fabrication method. Also, as illustrated in FIGS. 10 to 12, the anode assembly may have layers which may all be deposited by vacuum metalization or other metalizing techniques onto an electrode insulating layer, such as, for example, a polyester film; and the cathode/separator assembly may have layers which may all be coated by conventional liquid coating methods onto the temporary carrier substrate, which is subsequently removed. This has the advantage of potentially having each assembly, either anode assembly or cathode/separator assembly, involve only a single manufacturing coating method so that each finished assembly may conveniently be prepared on a single unit of production equipment and possibly in a single processing pass through the equipment. A further benefit is that the finished electrochemical cell contains only the substrate, if any, associated with the anode assembly. The cathode/separator assembly in the electrochemical cell may have no substrate since the temporary carrier substrate is removed prior to preparing the electrochemical cell. This is very important for minimizing the volume and weight of electrochemically inactive substrates in order to maximize the volumetric and gravimetric energy density of the electrochemical cell. For example, only 2 or 3 microns of an electrochmically inactive substrate in a AA size cell having an electrode area of 1000 $cm^2$ can result in a significant loss of energy density. Also, as illustrated, for example, in FIG. 12 with a lithium metal anode, the electrode insulating layer may be coated as a layer of the cathode/separator assembly and may be a very thin and tough coating such that no substrate is present in the electrochemical cell.

Electrochemical Cells

Another aspect of the present invention pertains to electrochemical cells prepared according to the methods of the present invention, as described herein. Thus, the electrochemical cells of the present invention comprise a cathode having a cathode active layer, an anode, and an electrolyte element interposed between the cathode and the anode, wherein the electrolyte element comprises (a) a microporous separator layer and (b) an electrolyte contained in pores of the separator; wherein the cells further comprise a cathode/separator assembly comprising the cathode active layer and the microporous separator layer, which cathode/separator assembly is prepared according to the methods of the present invention as described herein.

EXAMPLES

Several embodiments of the present invention are described in the following examples, which are meant by way of illustration and not by way of limitation.

Example 1

A coating mixture for a microporous separator layer was prepared by adding 23.8 g of a 13.5% by weight solids solution of boehmite sol in water (DISPAL 11N7-12, a trademark for aluminum boehmite sols available from CONDEA Vista company, Houston, Tex.) to 14.2 g of a 4% by weight solution of polyvinyl alcohol (AIRVOL 125, a trademark for polyvinyl alcohol polymers available from Air Products, Inc. Allentown, Pa.) in water and stirring to mix the materials. 0.05 g of FLUORAD FC-430, a trademark for non-ionic fluorochemical surfactants available from 3M Corporation, St. Paul, Minn., was added with stirring to make the final separator coating. Using a gap coating with a doctor blade and a hand coating process, the separator coating mix was applied to the non-treated surface of 23 micron thick MELINEX 6328, a trademark for polyethylene terephthalate (PET) films available from DuPont Teijin Films, Wilmington, Del. After air drying in a laboratory hood under a high rate of air circulation, a smooth and uniform microporous separator layer with a dry thickness of 14 microns was formed on the PET film substrate.

A cathode active layer with a composition by weight on a dry basis of 70% elemental sulfur (available from Aldrich Chemical Company, Milwaukee, Wis.), 15% PRINTEX XE-2 conductive pigment (a trademark for carbon pigments available from Degussa Corporation, Akron, Ohio), 15% of Fluka graphite 50870 (a trademark for graphite available from Fluka Chemical Company, Ronkonkoma, N.Y.), and 5% of LUVISKOL VA55E polyvinyl pyrrolidone-vinyl acetate (PVP/VA) copolymer (a trademark for polymers available from BASF Corporation, Mount Olive, N.J.) was prepared by suspending the dry ingredients in isopropanol and stirring, followed by adding the 50% solution of PVP-NVA to provide an overall coating mix solids of 14% and then grinding in a ball mill for 12 hours. The cathode active layer coating mix was then coated onto the microporous separator layer using a second gap coating bar with a doctor blade that provided a narrower coating width than the coating bar used to coat the separator layer. After air drying as done for the separator coating, a uniform cathode coating layer with a dry thickness of 15 microns was formed on the separator layer. There were uncoated lanes of separator layer on both sides of the cathode active layer due to the different widths of the coating bars.

The resulting composite of PET film as the temporary carrier substrate, the microporous separator layer, and the cathode active layer was then transported over a solid surface with a 90° angle with the surface of the PET film against the 90° angle of the solid surface to cause the delamination of the separator layer from the PET film, thereby removing the PET film from the composite to form a free standing cathode/separator assembly of the microporous separator layer and the cathode active layer.

This free-standing cathode-separator assembly was found to be suitable for use in combining with an anode such as lithium foil, an organic liquid electrolyte such as a 1.4 M solution of lithium imide (available from 3M Corporation, St. Paul, Minn.) in a 42:58 volume ratio mixture of 1,3-dioxolane and dimethoxyethane, and a cathode current collector such as nickel foil, to prepare a rechargeable electrochemical cell. The cell had a layered structure of anode-cathode/separator assembly (with the separator in a face to face relationship with the anode)-cathode current collector with the liquid electrolyte filling the void areas of the separator and the cathode active layer. The cell showed an initial specific capacity of over 500 mAh/g based on the elemental sulfur present.

Example 2

A 5% by weight solution of a 3:2 ratio by weight of CD 9038 (a trade name for ethoxylated bisphenol A diacrylate, available from Sartomer Inc., Exton, Pa.) and CN 984 (a tradename for a urethane acrylate available from Sartomer Inc., Exton, Pa.) was prepared by dissolving these macromonomers in ethyl acetate. To this solution, 14% by weight (based on the total weight of acrylates) of FLUORAD 430 and 0.2% by weight (based on the total weight of acrylates) of ESCURE KTO (a tradename for a photosensitizer available from Sartomer Inc., Exton, Pa.) were added. This solution was coated onto 23 micron thick MELINEX 6328 PET film using a gap coating bar with a doctor blade and dried by air drying in a laboratory hood to remove the solvent present and to form a protective coating layer. The coating thickness of the dried protective coating layer comprising a polymer in the form of macromonomers on the PET film was 1 micron. The dried film was then cured by placing it on the conveyor belt of a FUSION Model P300 UV exposure unit (available from Fusion Systems Company, Torrance, Calif.) and exposing it to the UV lamps for 30 seconds to form a cured protective coating layer comprising a polymer.

To this composite comprising the PET film as a temporary carrier substrate and the cured protective coating layer, a microporous separator layer was coated onto the outer surface of the protective coating layer using the separator coating mix and coating and drying process as described in Example 1. To the resulting composite of PET film, protective coating layer, and microporous separator layer, a cathode active layer was coated onto the outer surface of the separator layer using the cathode active layer coating mix and coating and drying process as described in Example 1.

The resulting composite of PET film as the temporary carrier substrate, the protective coating layer, the microporous separator layer, and the cathode active layer was then transported over a solid surface as described in Example 1 to cause the delamination of the protective coating layer from the PET film, thereby removing the PET film from the composite to form a free-standing cathode/separator assembly of the protective coating layer, the microporous separator layer, and the cathode active layer. This free-standing cathode/separator assembly was found to be suitable for use in combining with an anode, an organic electrolyte, and a cathode current collector to prepare a rechargeable electrochemical cell with the results being similar to those found with the cathode/separator assembly of Example 1.

Example 3

A free-standing cathode/separator assembly was prepared as described in Example 1 except that the coating mixture for the microporous separator layer was also used to apply an edge insulating layer onto the uncoated lanes on the separator layer prior to the delaminating step. The dry thickness of the edge insulating layer of the insulating boehmite xerogel layer was the same thickness as that of the cathode active layer. The edge insulating layer was coated on the entire surface of the separator layer that was not coated with the cathode active layer. This free-standing cathode/separator assembly of Example 3 gave similar results when fabricated into rechargeable electrochemical cells as those found with the cathode/separator assembly of Example 1.

While the invention has been described in detail and with reference to specific and general embodiments thereof, it will be apparent to one skilled in the art that various changes and modifications can be made therein without departing from the spirit and scope thereof.

What is claimed is:

1. A method of preparing a cathode/separator assembly for use in an electrochemical cell, wherein said cathode/separator assembly comprises a cathode active layer, a microporous separator layer and one or more protective coating layers comprising a polymer; wherein said separator layer comprises one or more microporous xerogel layers, and wherein said one or more protective coating layers are in contact with at least one of said one or more microporous xerogel layers of said separator layer; said method comprising the steps of:

(a) coating one of the one or more protective coating layers on a temporary carrier substrate, wherein said one of the one or more protective coating layers has a first surface in contact with said temporary carrier substrate and has a second surface on the side opposite from said temporary carrier substrate;

(b) coating said microporous separator layer on said second surface of said one of the one or more protective coating layers, wherein said separator layer has a first surface in contact with said second surface of said one of the one or more protective coating layers and has a second surface on the side opposite from said one of the one or more protective coating layers;

(c) coating said cathode active layer in a pattern on said second surface of said separator layer, wherein said cathode active layer has a first surface in contact with said second surface of said separator layer and has a second surface on the side opposite from said separator layer; and (d) removing said temporary carrier substrate from said first surface of said one of the one or more protective coating layers to form said cathode/separator assembly.

2. The method of claim 1, wherein one of said one or more microporous xerogel layers of said separator layer is coated in step (b) on said second surface of said one of the one or more protective coating layers.

3. The method of claim 1, wherein a second protective coating layer of said one or more protective coating layers of said cathode/separator assembly is coated in step (c) on said second surface of said separator layer prior to coating said cathode active layer, wherein said second of the one or more protective coating layers has a first surface in contact with said second surface of said separator layer and has a second surface on the side opposite from said separator layer, and said cathode active layer is coated in a pattern in step (c) on said second surface of said second of the one or more protective coating layers, wherein said cathode active layer has a first surface in contact with said second of the one or more protective coating layers and has a second surface on the side opposite from said second of the one or more protective coating layers.

4. The method of claim 1, wherein said temporary carrier substrate is a flexible web substrate.

5. The method of claim 4, wherein said flexible web substrate is selected from the group consisting of papers, polymeric films, and metals.

6. The method of claim 4, wherein said flexible web substrate is surface treated with a release agent.

7. The method of claim 1, wherein said cathode active layer comprises an electroactive material selected from the group consisting of electroactive metal chalcogenides, electroactive conductive polymers, and electroactive sulfur-containing materials.

8. The method of claim 1, wherein said cathode active layer comprises elemental sulfur.

9. The method of claim 1, wherein said cathode active layer comprises an electroactive sulfur-containing organic polymer, wherein said sulfur-containing organic polymer, in its oxidized state, comprises one or more polysulfide moieties, $—S_m—$, where m is an integer equal to or greater than 3.

10. The method of claim 1, wherein said cathode active layer comprises an electroactive sulfur-containing organic polymer, wherein said sulfur-containing organic polymer, in its oxidized state, comprises one or more polysulfide moieties, $—S_m^-$, where m is an integer equal to or greater than 3.

11. The method of claim 1, wherein said cathode active layer comprises an electroactive sulfur-containing organic polymer, wherein said sulfur-containing organic polymer, in its oxidized state, comprises one or more polysulfide moieties, $S_m^{2-}$, where m is an integer equal to or greater than 3.

12. The method of claim 1, wherein said pattern of said cathode active layer does not completely coat said second surface of said separator layer.

13. The method of claim 1, wherein said method further comprises a step of coating an edge insulating layer in a pattern on said second surface of said separator layer, wherein said edge insulating layer has a first surface in contact with said second surface of said separator layer and has a second surface on the side opposite from said separator layer.

14. The method of claim 13, wherein said step of coating said edge insulating layer occurs subsequent to steps (a), (b) and (c), and prior to step (d).

15. The method of claim 13, wherein said pattern of said edge insulating layer comprises the remaining area of said second surface of said separator layer that is not coated with said pattern of said cathode active layer.

16. The method of claim 13, wherein a portion of said pattern of said edge insulating layer is in contact with a portion of said pattern of said cathode active layer.

17. The method of claim 14, wherein the thickness of said edge insulating layer is the same as the thickness of said cathode active layer.

18. The method of claim 13, wherein said step of coating said edge insulating layer occurs subsequent to step (a) and (b) and prior to steps (c) and (d).

19. The method of claim 13, wherein said edge insulating layer comprises an insulating xerogel layer.

20. The method of claim 13, wherein said edge insulating layer comprises an insulating non-porous, polymeric layer.

21. The method of claim 1, wherein said method further comprises a step of depositing a cathode current collector layer in a pattern on said second surface of said cathode active layer, wherein said cathode current collector layer has a first surface in contact with said second surface of said cathode active layer and has a second surface on the side opposite from said cathode active layer.

22. The method of claim 21, wherein said step of depositing said cathode current collector layer occurs subsequent to steps (a), (b) and (c), and prior to step (d).

23. The method of claim 21, wherein said method further comprises a step of coating an electrode insulating layer in a pattern on said second surface of said cathode current collector layer.

24. The method of claim 13, wherein said method further comprises a step of depositing a cathode current collector layer in a pattern on said second surface of said cathode active layer, wherein said cathode current collector layer has a first surface in contact with said second surface of said cathode active layer and has a second surface on the side opposite from said cathode active layer.

25. The method of claim 24, wherein said step of depositing said cathode current collector layer further comprises depositing said cathode current collector layer in a pattern on said second surface of said edge insulating layer, wherein said cathode current collector layer further has said first surface in contact with said second surface of said edge insulating layer and has said second surface on the side opposite from said edge insulating layer.

26. The method of claim 24, wherein said step of depositing said cathode current collector layer occurs subsequent to steps (a), (b) and (c), subsequent to said step of coating said edge insulating layer, and prior to step (d).

27. The method of claim 24, wherein said step of depositing said cathode current collector layer occurs subsequent to steps (a), (b) and (c), prior to said step of coating said edge insulating layer, and prior to step (d).

28. The method of claim 24, wherein said method further comprises a step of coating an electrode insulating layer in a pattern on said second surface of said cathode current collector layer.

29. The method of claim 25, wherein said method further comprises a step of coating an electrode insulating layer in a pattern on said second surface of said cathode current collector layer and on said second surface of said edge insulating layer.

30. The method of claim 1, wherein said step (c) of coating said cathode active layer comprises a lamination step of applying an assembly comprising said cathode active layer to said second surface of said separator layer.

31. The method of claim 30, wherein, in step (c), said assembly comprising said cathode active layer further comprises a second temporary carrier substrate, and wherein, subsequent to step (c), there is a step of removing said second temporary carrier substrate from said assembly comprising said cathode active layer.

32. A cathode/separator assembly prepared according to the method of claim 1.

33. A cathode/separator assembly prepared according to the method of claim 13.

34. A method preparing a cathode/separator assembly for use in an electrochemical cell, wherein said cathode/separator assembly comprises a cathode active layer, a microporous separator layer and one or more protective coating layers comprising a polymer; wherein said separator layer comprises one or more microporous pseudo-boehmite layers, and wherein said one or more protective coating layers are in contact with at least one of said one or more microporous pseudo-boehmite layers of said separator layer; said method comprising the steps of:

(a) coating one of the one or more protective coating layers on a temporary carrier substrate, wherein said one of the one or more protective coating layers has a first surface in contact with said temporary carrier substrate and has a second surface on the side opposite from said temporary carrier sub;

(b) coating said microporous separator layer on said second surface of said one of the one or more protective coating layers, wherein said separator layer has a first surface in contact with said second surface of said one of the one or more protective coating layers and has a second surface on the side opposite from said one of the one or more protective coating layers;

(c) coating said cathode active layer in a pattern on said second surface of said separator layer, wherein said cathode active layer has a first surface in contact with said second surface of said separator layer and has a second surface on the side opposite from said separator layer; and (d) removing said temporary carrier substrate from said first surface of said one of the one or more protective coating layers to form said cathode/separator assembly.

35. The method of claim 34, wherein one of said one or more microporous pseudo-boehmite layers of said separator layer is coated in step (b) on said second surface of said one of the one or more protective coating layers.

36. The method of claim 7, wherein a second protective coating layer of said one or more protective coating layers of said cathode/separator assembly is coated in step (c) on said second surface of said separator layer prior to coating said cathode active layer, wherein said second of the one or more protective coating layers has a first surface in contact with said second surface of said separator layer and has a second surface on the side opposite from said separator layer, and said cathode active layer is coated in a pattern in step (c) on said second surface of said second of the one or more protective coating layers, wherein said cathode active layer has a first surface in contact with said second of the one or more protective coating layers and has a second surface on the side opposite from said second of the one or more protective coating layers.

37. A method of preparing an electrochemical cell, said method comprising the steps of:
  (a) providing a cathode/separator assembly, wherein said cathode/separator assembly comprises a cathode active layer, a microporous separator layer and one or more protective coating layers comprising a polymer, prepared by a method comprising the steps of:
    (i) coating one of the one or more protective coating layers on a temporary carrier substrate, wherein said one of the one or more protective coating layers has a first surface in contact with said temporary carrier substrate and has a second surface on the side opposite from said temporary carrier substrate;
    (ii) coating said microporous separator layer on said second surface of said one of the one or more protective coating layers, wherein said separator layer has a first surface in contact with said second surface of said one of the one or more protective coating layers and has a second surface on the side opposite from said one of the one or more protective coating layers;
    (iii) coating said cathode active layer in a pattern on said second surface of said separator layer, wherein said cathode active layer has a first surface in contact with said second surface of said separator layer and has a second surface on the side opposite from said separator layer; and
    (iv) removing said temporary carrier substrate from said first surface of said one of the one or more protective coating layers to form said cathode/separator assembly;
  (b) providing an anode;
  (c) providing a cathode current collector layer;
  (d) providing an electrode insulating layer interposed between said anode and said cathode current collector layer; and
  (e) providing an electrolyte, wherein said electrolyte is contained in pores of said separator layer;
wherein said first surface of said one of the one or more of the protective coating layers of said cathode/separator assembly and said anode are positioned in a face-to-face relationship and said second surface of said cathode active layer and said cathode current collector layer are positioned in a face-to-face relationship.

38. The method of claim 37, wherein said separator layer comprises one or more microporous xerogel layers.

39. The method of claim 38, wherein said one or more protective coating layers are in contact with at least one of said one or more microporous xerogel layers of said separator layer.

40. The method of claim 37, wherein said separator layer comprises one or more microporous pseudo-boehmite layers.

41. The method of claim 40, wherein said one or more protective coating layers are in contact with at least one of said one or more microporous pseudo-boehmite layers of said separator layer.

42. The method of claim 37, wherein said cathode active layer comprises an electroactive material selected from the group consisting of electroactive transition metal chalcogenides, electroactive conductive polymers, and electroactive sulfur-containing materials.

43. The method of claim 37, wherein said cathode active layer comprises elemental sulfur.

44. The method of claim 37, wherein said cathode active layer comprises an electroactive sulfur-containing organic polymer, wherein said sulfur-containing organic polymer, in its oxidized state, comprises one or more polysulfide moieties, $-S_m-$, where m is an integer equal to or greater than 3.

45. The method of claim 37, wherein said cathode active layer comprises an electroactive sulfur-containing organic polymer, wherein said sulfur-containing organic polymer, in its oxidized state, comprises one or more polysulfide moieties, $-S_m^-$, where m is an integer equal to or greater than 3.

46. The method of claim 37, wherein said cathode active layer comprises an electroactive sulfur-containing organic polymer, wherein said sulfur-containing organic polymer, in its oxidized state, comprises one or more polysulfide moieties, $S_m^{2-}$, where m is an integer equal to or greater than 3.

47. The method of claim 37, wherein said pattern of said cathode active layer does not completely coat said second surface of said separator layer.

48. The method of claim 37, wherein said method further comprises a step of depositing a cathode current collector layer in a pattern on said second surface of said cathode active layer.

49. The method of claim 37, wherein said anode comprises an anode active material selected from the group consisting of lithium metal, lithium-aluminum alloys, lithium-tin alloys, lithium-intercalated carbons, and lithium-intercalated graphites.

50. The method of claim 37, wherein said electrode insulating layer comprises a polymeric plastic film.

51. The method of claim 37, wherein said electrode insulating layer comprises a polymeric coating.

52. The method of claim 37, wherein said electrolyte comprises one or more materials selected from the group consisting of liquid electrolytes, gel polymer electrolytes, and solid polymer electrolytes.

53. The method of claim 37, wherein said electrolyte comprises a liquid electrolyte.

54. The method of claim 37, wherein said electrochemical cell is a secondary cell.

55. The method of claim 37, wherein said electrochemical cell is a primary cell.

56. The method of claim 37, wherein said step (iii) of coating said cathode active layer comprises a lamination step of applying an assembly comprising said cathode active layer to said second surface of said separator layer.

57. The method of claim 56, wherein, in step (iii), said assembly comprising said cathode active layer further comprises a second temporary carrier substrate, and wherein, subsequent to step (iii), there is a step of removing said second temporary carrier substrate from said assembly comprising said cathode active layer.

58. An electrochemical cell prepared according to the method of claim 37.

59. The method of claim 37, wherein said method further comprises, the step of coating an edge insulating layer in a pattern on said second surface of said separator layer, wherein said edge insulating layer has a first surface in contact with said second surface of said separator layer and has a second surface on the side opposite from said separator layer.

60. The method of claim 59, wherein said step of coating said edge insulating layer occurs subsequent to steps (i), (ii) and (iii), and prior to step (iv).

61. The method of claim 59, wherein said pattern of said edge insulating layer comprises the remaining area of said second surface of said separator layer that is not coated with said pattern of said cathode active layer.

62. The method of claim 59, wherein a portion of said pattern of said edge insulating layer is in contact with a portion of said pattern of said cathode active layer.

63. The method of claim 60, wherein the thickness of said edge insulating layer is the same as the thickness of said cathode active layer.

64. The method of claim 59, wherein said step of coating said edge insulating layer occurs subsequent to step (i) and (ii), and prior to steps (iii) and (iv).

65. The method of claim 59, wherein said edge insulating layer comprises an insulating xerogel layer.

66. The method of claim 59, wherein said edge insulating layer comprises an insulating non-porous, polymeric layer.

67. A method of preparing an electrochemical cell, said cell comprising a casing and a multilayer cell stack, which method comprises the steps of:

(a) providing a laminar combination of:
  (i) an anode assembly comprising an anode comprising an anode active layer, wherein said anode active layer comprises an anode active material comprising lithium; a first cathode current collector layer; and an electrode insulating layer interposed between said anode and said first cathode current collector layer; and
  (ii) a cathode/separator assembly comprising a cathode active layer in a first coating pattern on a first surface of a microporous separator layer and with an edge insulating layer in a second coating pattern on said first surface of said separator layer, wherein said cathode active layer has a first surface in contact in said first coating pattern with said first surface of said separator layer and has a second surface on the side opposite from said separator layer, and said edge insulating layer has a first surface in contact in said second coating pattern with said first surface of said separator layer and has a second surface on the side opposite to said separator layer; and wherein a second cathode current collector layer is deposited in a third coating pattern on said second surface of said cathode active layer and on said second surface of said edge insulating layer of said cathode/separator assembly;

wherein said first cathode current collector layer and said second cathode current collector layer are positioned in a face-to-face relationship;

(b) winding said laminar combination to form an anode-electrode insulating layer-first cathode current collector layer-cathode/separator assembly multilayer cell stack, wherein said first cathode current collector layer is in contact with said second cathode current collector layer;

(c) providing an electrolyte, wherein said electrolyte is contained in pores of said separator layer of said multilayer cell stack;

(d) providing a casing to enclose said multilayer cell stack; and (e) sealing said casing.

68. The method of claim 67, wherein said anode further comprises an anode current collector layer and said anode current collector layer is interposed between said anode active layer and said electrode insulating layer.

69. The method of claim 67, wherein said cathode/separator assembly of step (a) further comprises a temporary carrier substrate on a second surface of said separator layer, which second surface is on the side opposite from said cathode active layer and said edge insulating layer, and wherein said method further comprises a step of removing said temporary carrier substrate from said second surface of said separator layer prior to completion of step (b).

70. The method of claim 67, wherein said anode of said anode assembly and said second surface of said separator layer of said cathode/separator assembly are positioned in a face-to-face relationship in step (a); and further wherein a first cathode current collector layer-electrode insulating layer-anode-cathode/separator assembly multilayer cell stack is formed in step (b), wherein said anode is in contact with said second surface of said separator layer.

71. The method of claim 70, wherein said cathode/separator assembly of step (a) further comprises a temporary carrier substrate on a second surface of said separator layer, which second surface is on the side opposite from said cathode active layer and said edge insulating layer, and wherein said method further comprises a step of removing said temporary carrier substrate from said second surface of said separator layer prior to completion of step (b).

72. The method of claim 67, wherein said electrochemical cell is a secondary cell.

73. The method of claim 67, wherein said electrochemical cell is a primary cell.

74. An electrochemical cell prepared according to the method of claim 67.

\* \* \* \* \*